June 13, 1939. J. BAUMFALK ET AL 2,161,945
TIME-OF-DAY ANNOUNCING SYSTEM
Filed Aug. 6, 1936   11 Sheets-Sheet 6

INVENTORS: J. BAUMFALK
W. BENNETT
P. L. WRIGHT
BY
P. C. Smith
ATTORNEY

June 13, 1939.  J. BAUMFALK ET AL  2,161,945
TIME-OF-DAY ANNOUNCING SYSTEM
Filed Aug. 6, 1936   11 Sheets-Sheet 11

INVENTORS: J. BAUMFALK
W. BENNETT
P. L. WRIGHT
BY P. C. Smith
ATTORNEY

Patented June 13, 1939

2,161,945

UNITED STATES PATENT OFFICE 2,161,945

TIME-OF-DAY ANNOUNCING SYSTEM

John Baumfalk, Jersey City, N. J., and William Bennett, Brooklyn, N. Y., and Paul L. Wright, Short Hills, N. J., assignors to Bell Telephone Laboratories, Incorporated, New York, N. Y., a corporation of New York Application August 6, 1936, Serial No. 94,532

12 Claims. (Cl. 179—6)

This invention relates to telephone systems and more particularly to circuits for enabling subscribers to obtain pronouncements of the time of day.

Heretofore provision has been made for enabling subscribers to obtain the correct time of day by calling a central time service bureau. The time service bureau is serviced by an operator who in response to an incoming call observes the correct time as indicated by a time clock and informs the subscriber what the correct time will be when he hears the next tone signal.

Systems of this character have proven to be very satisfactory in large exchange areas where the volume of calls for the service warrants the constant attendance of an operator at the central time bureau. In small office or exchange areas, however, more economical service may be rendered by a time announcing machine of an automatic character since the volume of calls for time-of-day service would not justify the full time services of an operator. Furthermore, a demand has arisen for equipment which may be used by advertisers for supplying time-of-day service to subscribers together with pronouncements advertising their particular products.

It is therefore the object of the invention to provide trunking and control facilities for enabling subscribers to obtain connections with an automatic time-of-day announcing machine whereby efficient, dependable time-of-day service may be furnished.

In accordance with the present invention central office distributing, control, amplifier and transfer circuits are provided. All central office trunks which are allocated for time-of-day service are connected in multiple to the transfer circuit and may be manually or automatically transferred to either one of two duplicate channels or trunks outgoing to one or more time-of-day announcing machines. These machines may be located, if desired, at the central office if the service is to be supplied by the telephone company, or may be located at a subscriber's premises if such subscriber is furnishing time-of-day service as an advertising medium. The central office trunks incoming to the central office may be of different types dependent upon whether the circuits are installed in manual, step-by-step or panel type exchange areas.

Each of the channels or trunks outgoing to the announcing machine is provided with a one-way repeater equipment for enabling the transmission of time-of-day pronouncements from the announcing machine to as many subscribers' lines as may be simultaneously calling for such service. This trunk and repeater equipment is supplied in duplicate to avoid insofar as possible a disruption of the service. A distributing equipment is also provided for transmitting cut-through signals and pronouncement termination signals to all incoming trunks which have been seized by calling subscribers.

To obviate a disruption of service provision is made for automatically transferring calling trunks from one outgoing trunk to another outgoing trunk under different conditions of failure. If after the central office equipment has been signaled from some incoming trunk that time-of-day service is required, the announcing machine associated therewith has been started and a cut-through signal has been transmitted to the calling trunk just prior to the beginning of the pronouncement, the repeater circuit of the channel or outgoing trunk then in service does not receive any speech current from the machine, a speech current detector in the repeater circuit functions to cause the automatic transfer of the incoming trunks to the second channel or outgoing trunk. Automatic transfer is also effected if a trouble condition is encountered on the outgoing trunk which is in service or if the announcement machine does not start within a predetermined interval, or if upon transfer from one outgoing trunk to the other, voice current is not detected in either repeater indicating possible trouble on both trunks or with the announcing machine at the time in service. In the latter case, transfer back to the first trunk is effected and an automatic transfer of both trunks to the other announcing machine is made and if then no speech current is detected, a transfer is made to the second outgoing trunk in a second attempt to find a combination of an outgoing trunk and announcing machine in operative condition.

It is believed that a better understanding of the invention will be had by reference to the following description taken in connection with the accompanying drawings of which:

Fig. 1 shows subscribers' lines terminating in three types of offices and the schematic representation of the call forwarding equipment of each office, the office represented in the upper portion of the figure illustrating switching equipment of the panel type, the office represented in the central portion of the figure being of the manual type and the office represented in the lower portion of the figure illustrating switching equipment of the step-by-step type;

Figure 5:
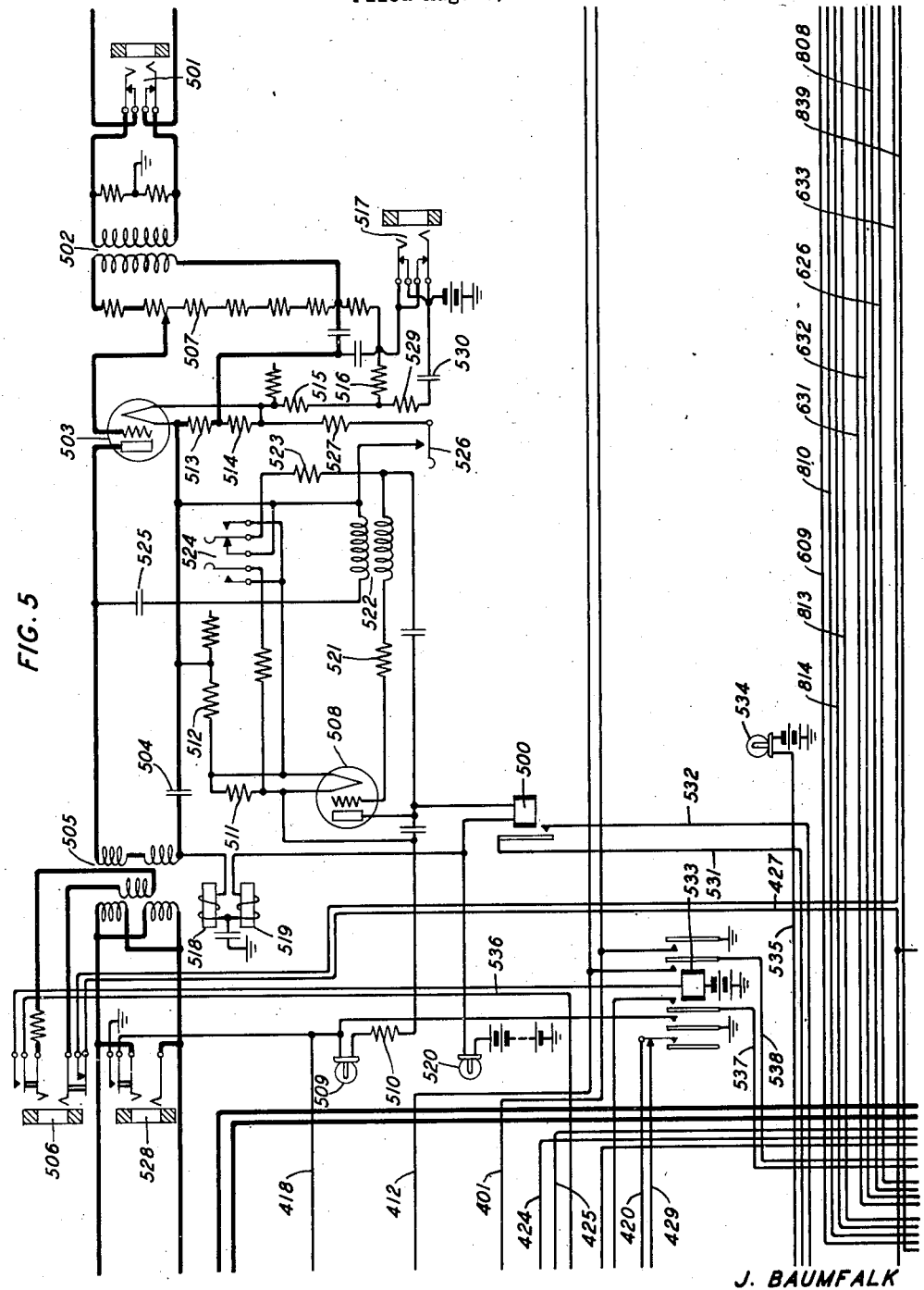
Figure 6:
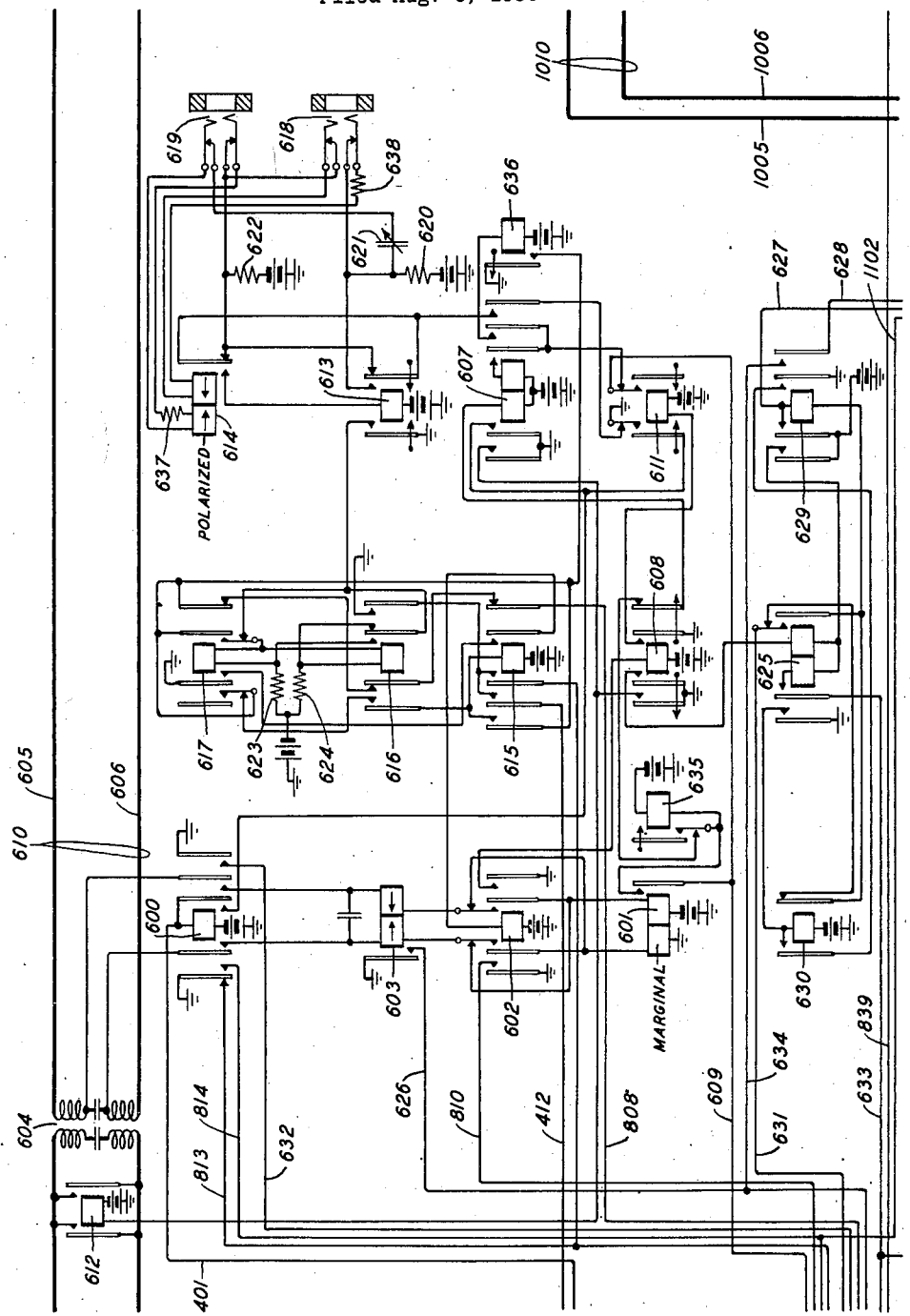
Figure 7:
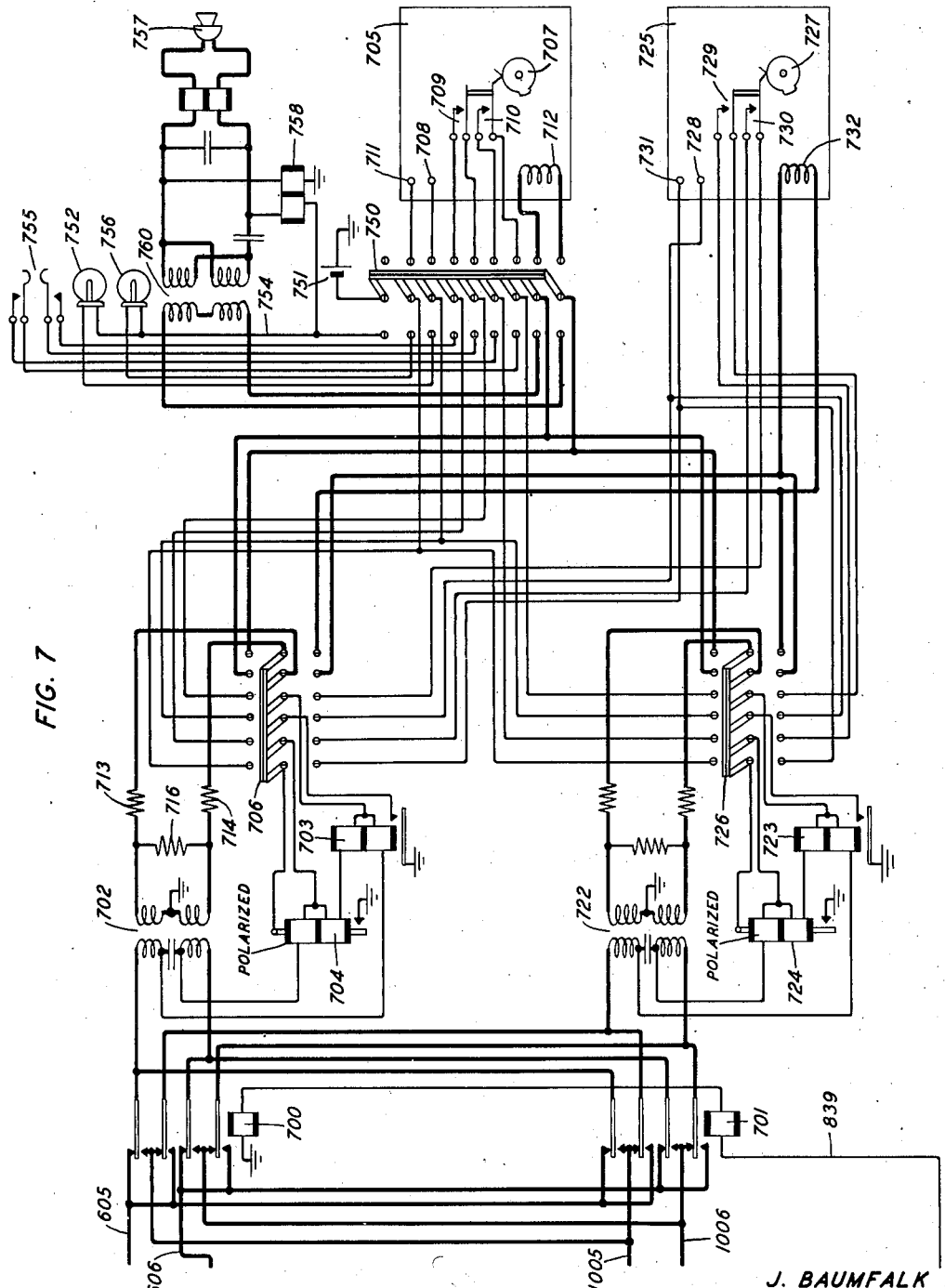
Figure 8:
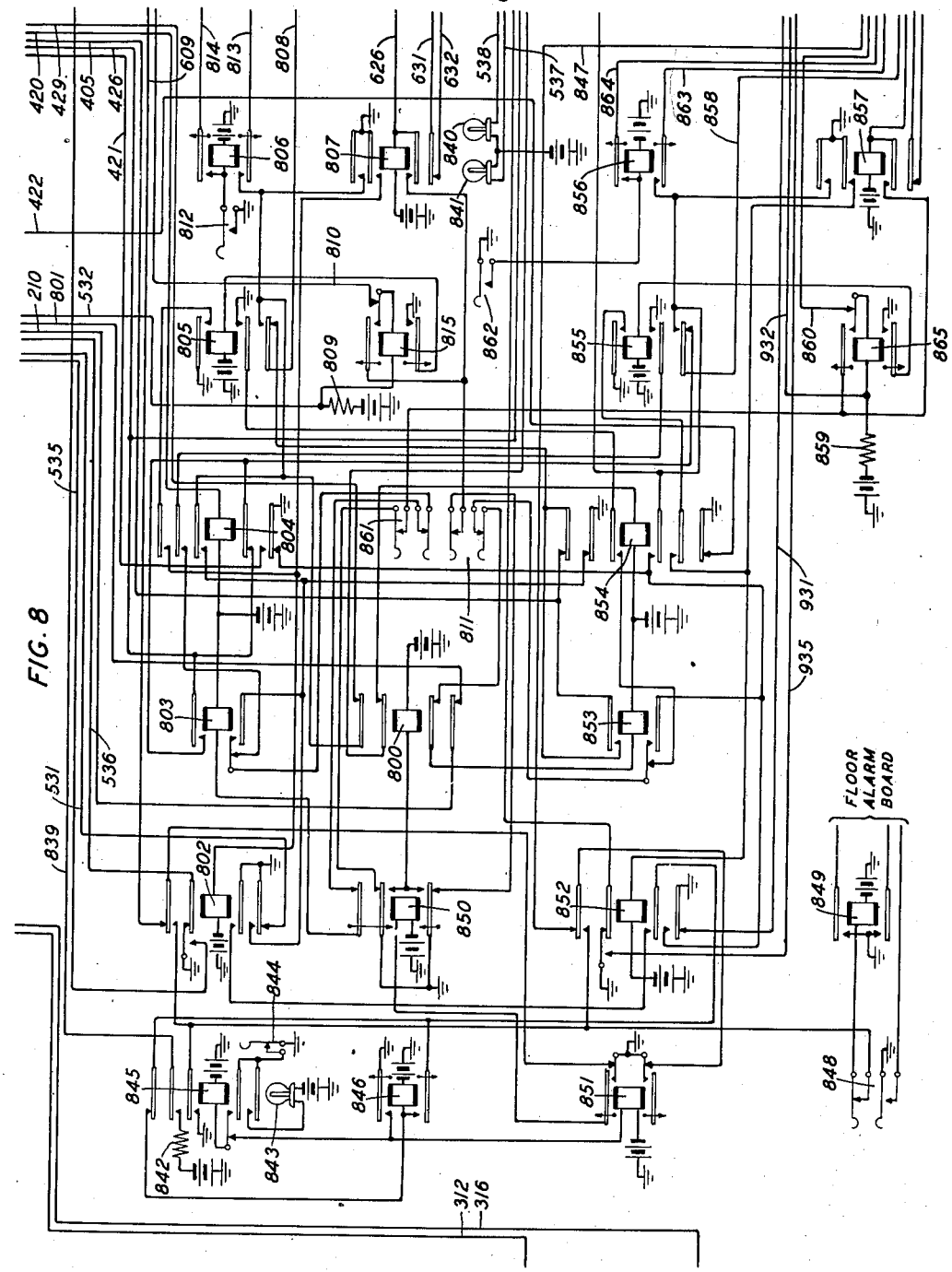
Figure 9:
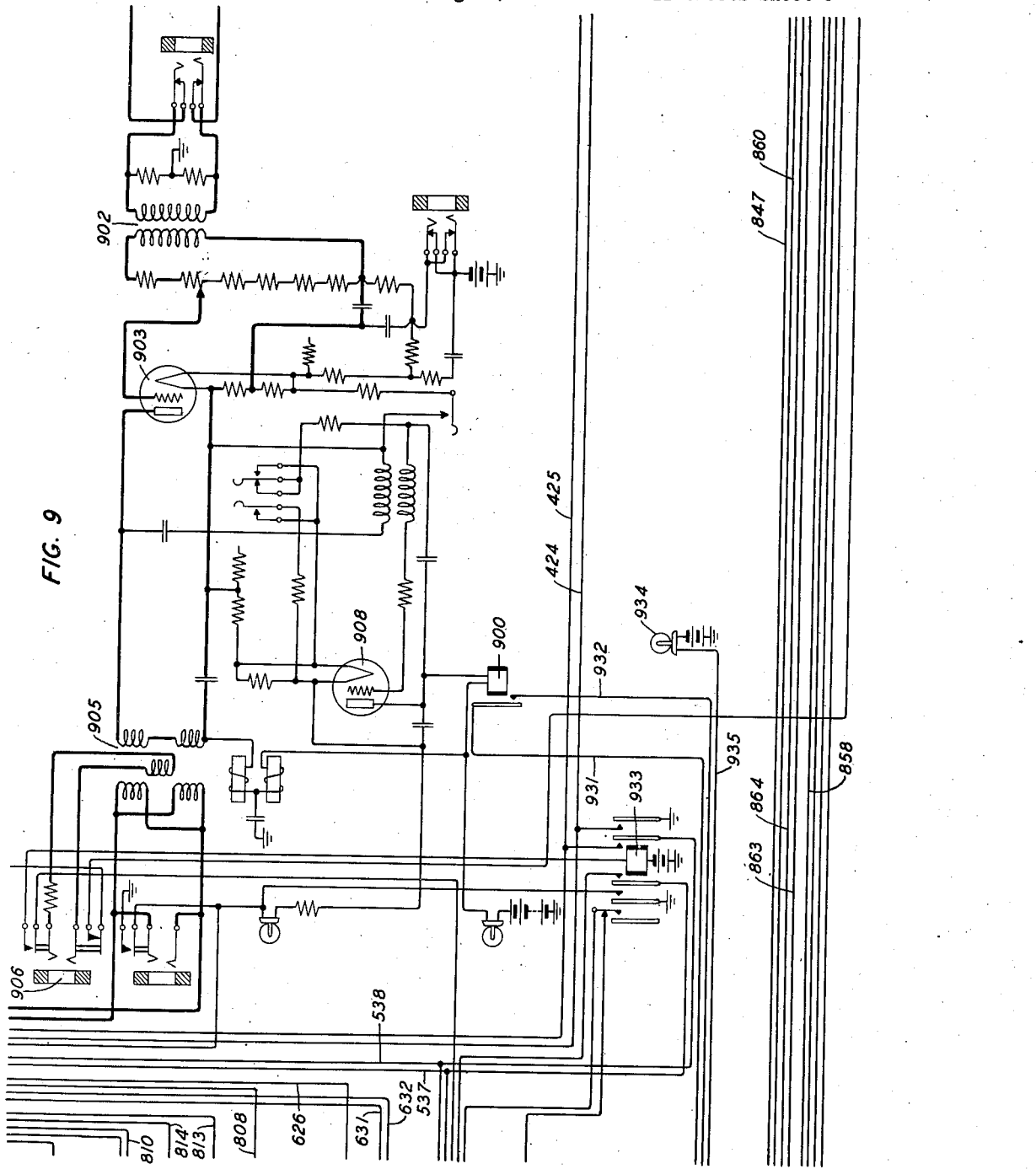
Figure 10:
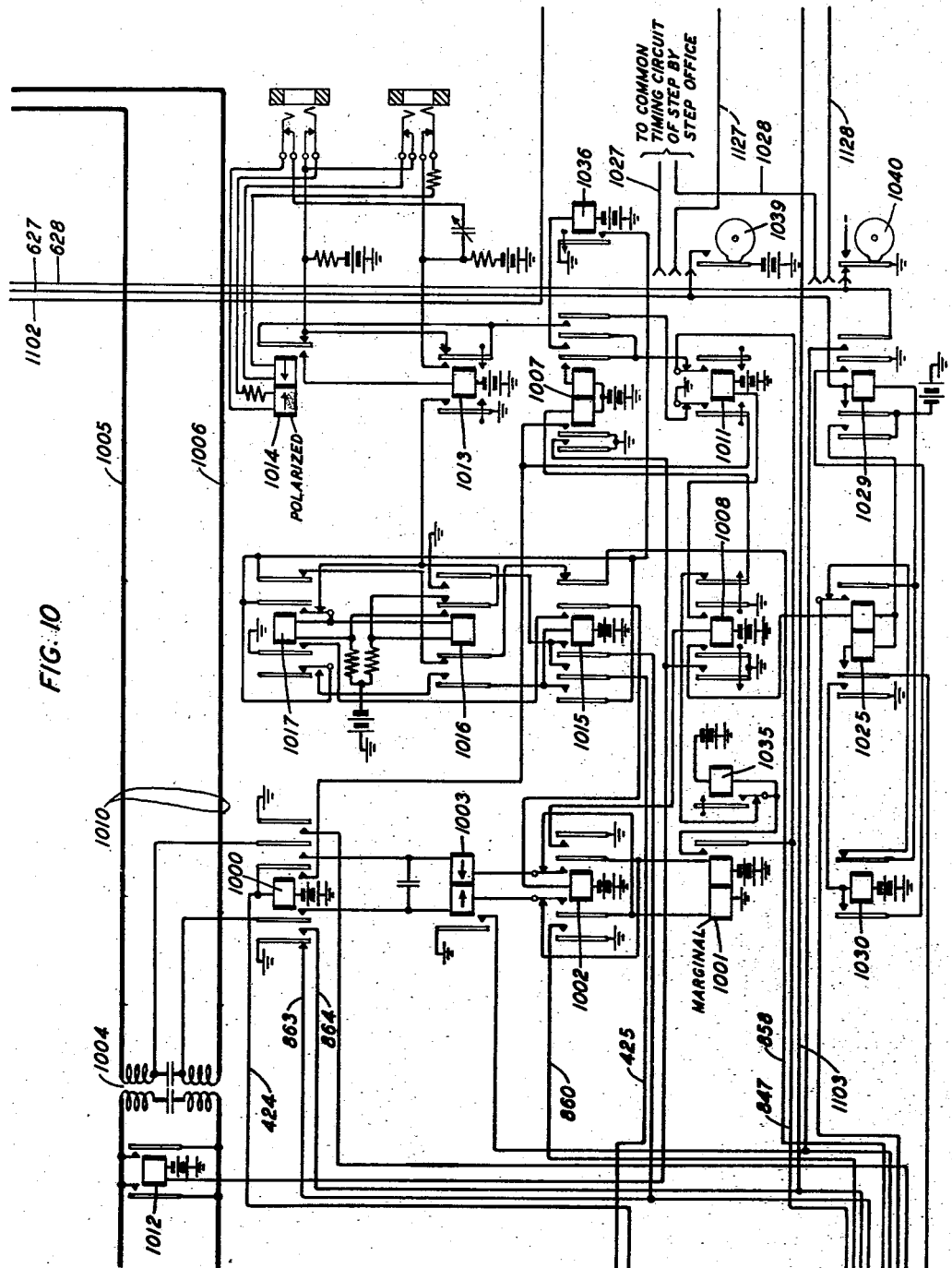
Figure 11:
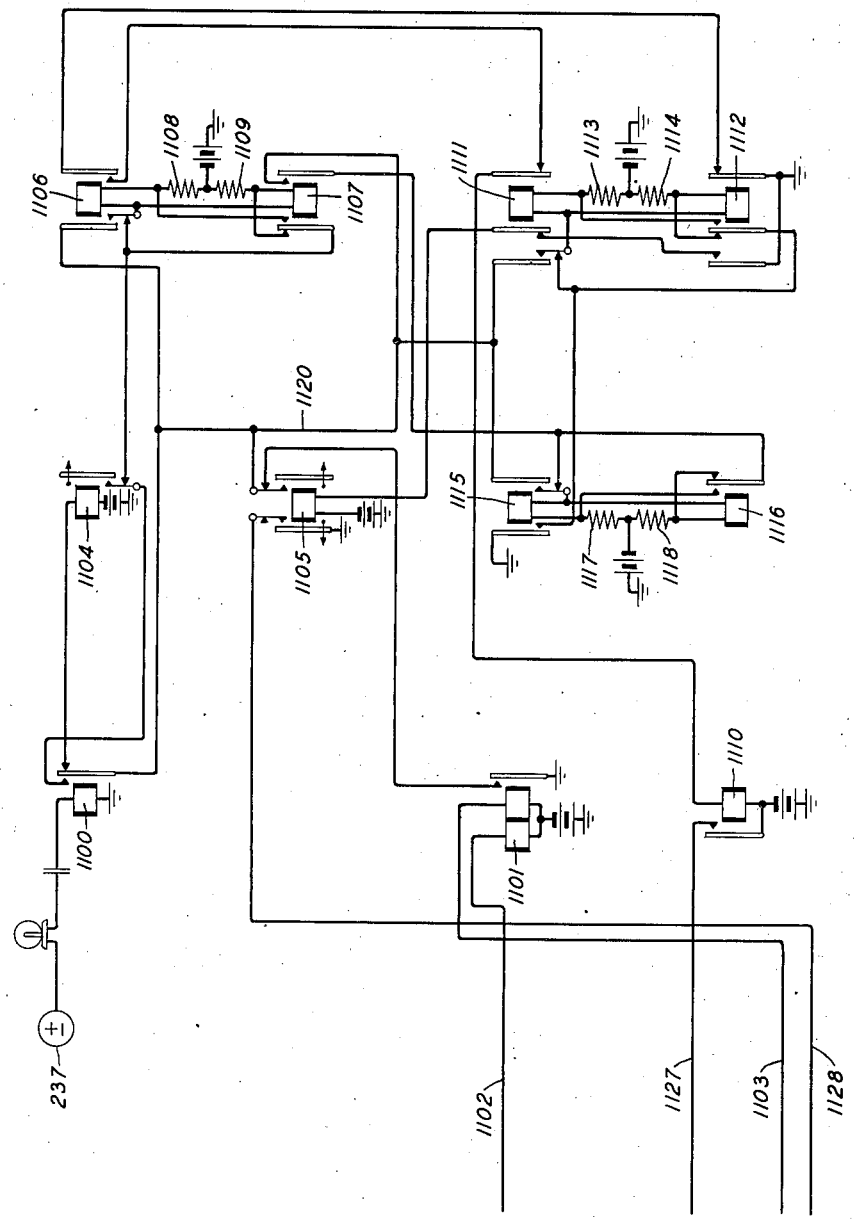

Figs. 5 and 6 taken together show the central office or outgoing end of one channel or outgoing trunk;

Fig. 7 shows the distant end of two outgoing trunks or channels and the schematic representation of two announcing machines and an operator's announcing equipment;

Fig. 8 shows relay equipment for controlling the transmission of cut-through and terminating signals to connected incoming trunks and for controlling the manual or automatic transfer of incoming trunks to either of the two channels or outgoing trunks;

Figs. 9 and 10 taken together show the central office or outgoing end of a second channel or outgoing trunk;

Fig. 11 shows a timing circuit for use when the system is installed in a manual area; and Fig. 12 is a chart showing how the several figures of the drawing should be arranged to disclose the complete circuits in accordance with the invention.

The announcing machines 705 and 725 diagrammatically illustrated in Fig. 7 may be of any desired type, the present invention not being specifically concerned with the machines per se, but rather with the trunking circuits by which such machines may be associated with calling subscribers' lines. The transfer switches 706 and 726 are provided for enabling two incoming channels or trunks to be connected to either machine or to enable both trunks to be connected to one machine, but not enabling both machines to be connected to the same trunk.

*Call from a subscriber of a panel type office*

Figure 1:
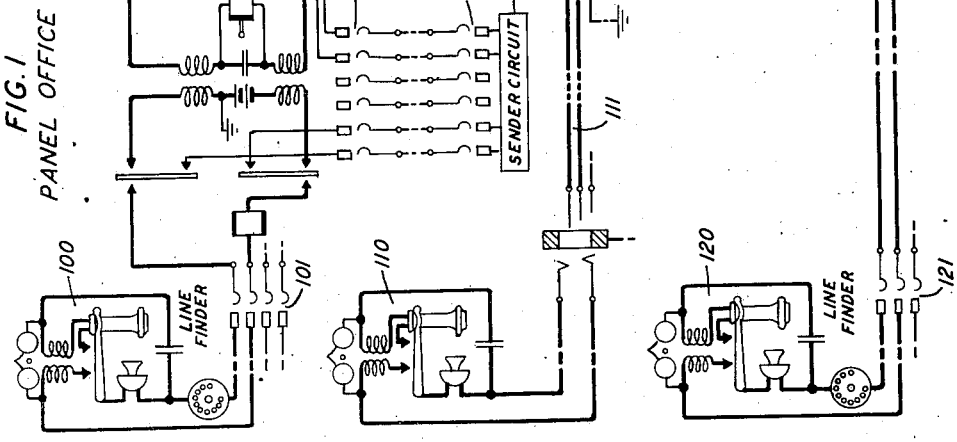

It will first be assumed that the subscriber whose line 100 terminates in the panel type office disclosed in the upper portion of Fig. 1 initiates a call for ascertaining the time of day and dials the directory number set aside for such service. Upon the initiation of such a call the subscriber's line becomes associated by means of line finder 101, district finder 102 and sender selector 103 with the sender 104 and, when the subscriber dials, the line number becomes registered in the sender in the usual manner. The sender then proceeds to cause the setting of the district selector 105, office selector 106, incoming selector 107 and final selector 108 to select an idle trunk of the group allocated for time-of-day service, for example, the trunk shown in the upper portion of Fig. 2.

Upon the seizure of this trunk a circuit is established from ground over contacts of a sequence switch cam in the final selector 108, sleeve brush of selector 108 and the sleeve terminal of the selected trunk to battery through the windings of sleeve relay 200. Relay 200 operates and establishes an obvious circuit for relay 201 which also operates. Relay 201 upon operating establishes the circuit of a traffic register, if required, from ground over its lower contact and the lower back contact of relay 209, connects ground to conductor 203 and to the locking contacts of relays 206 and 209 over its upper front contact, and over its inner lower contact establishes a start circuit.

The start circuit may be traced from ground over the inner lower contact of relay 201, upper back contact of relay 209, conductor 210, lower back contact of relay 800, conductor 801, lower back contacts of transfer relay 400, conductor 401, winding of start relay 600 to battery. Relay 600 operates and establishes a circuit over the upper channel or outgoing trunk 610 which may be traced from ground, left winding of relay 601, right normal contacts of relay 602, right winding of differential relay 603, middle right front contact of relay 600, upper right winding of repeating coil 604, tip conductor 605 of the outgoing trunk 610, thence in parallel over the upper back contacts of relays 700 and 701, upper left winding of repeating coil 702, in series through the two windings of relay 703 and through the two windings of polarized relay 704, lower left winding of repeating coil 702, thence in parallel over the next-to-inner back contacts of transfer relays 700 and 701, ring conductor 606 of trunk 610, lower right winding of repeating coil 604, inner left front contact of relay 600, left winding of relay 603, left normal contacts of relay 602, right winding of relay 601 to battery. Relay 703 now operates, but since the current flowing over this circuit passes through both windings of differential relay 603 and is of insufficient strength because of the inclusion of all the windings of relays 703 and 704, differential relay 603 and marginal relay 601 do not operate at this time. Polarized relay 704 also does not operate since the direction of current flowing through its windings is not in the proper direction.

It will be assumed that the announcing machine 705 is in service and that the transfer switch 706 is operated to its upper position and transfer switch 750 is operated to the right thereby associating this machine with the incoming end of trunk 610. Upon the operation of relay 703 a circuit for starting that part of machine 705 which controls cam 707, if it is not already in operation, is established, which circuit may be traced in part from ground at the contacts of relay 703, contacts of switch 706 and switch 750 to start conductor 708. The machine 705 is arranged to give a short closure of the contacts controlled by cam 707 at an interval before it is ready to make the next time pronouncement, but the actual pronouncement will be delayed until a pronouncement signal is received from the central office as hereinafter described. The closure of the contacts by cam 707 shunts the upper winding of relay 703 and the lower winding of relay 704 over a circuit which may be traced from the mid-point between the windings of relay 703, contacts of switch 706, contacts of switch 750, cam contacts 709, contacts of switches 750 and 706 to the mid-point between the windings of relay 704. If machine 705 is also at the time associated with the other trunk 1010 extending from the central office through the operation of transfer switch 726 to its upper position, a similar circuit is also established over the cam contacts 710 and contacts of switch 750 around the upper winding of relay 723 and the lower winding of relay 724, but without effect at this time.

With one winding of each of the relays 703 and 704 shunted the strength of current flowing over the trunk 610 is increased to such an extent that marginal relay 601 now momentarily operates and establishes an obvious circuit for slow-to-operate relay 635 and a circuit for relay 607 which extends from battery through the left winding of relay 607, back contact of relay 608, normal contacts of relay 635, contacts of relay 601, conductor 609, upper back contact of relay 802 to ground at the upper normal contacts of relay 851. When relay 635 operates it opens the operating circuit of relay 607 but in the meantime relay 607 has operated and closed a locking circuit for itself over its right winding and inner right front contact and the right normal contacts of relay 611 to ground on conductor 609. Relay 607 also closes a locking circuit for start relay 600 extending through the winding and inner right front contacts of relay 600 to ground at the inner left front contact of relay 607 and establishes the circuit of relay 612 which may be traced from battery through the winding of relay 612 to ground at the outer left front contact of relay 607. Relay 612 upon operating, shunts the left windings of repeating coil 604 to prevent acoustic disturbances due to signaling from reaching calling subscribers' lines and to prevent the premature operation of the voice alarm relay 500 on surges due to signaling.

Relay 607 at its middle right front contact also closes the circuit of slow-to-release relay 636 which in turn closes the circuit of the distributing relays 402, 403, etc., which are common to all incoming trunks. This circuit may be traced from battery through the windings of these relays, lower back contact of transfer relay 404, conductor 405, upper back contact of relay 854, lower back contact of relay 805, conductor 808, right back contact of relay 615, left back contact of relay 616, outer right back contact of relay 617 to ground at the contact of relay 636. Relays 402, 403, etc., operate closing obvious circuits for secondary distributing relays such as 406, 407, 408, 409, etc. Each relay such as 406 controls the establishment of cut-through signaling circuits for five incoming trunks and therefore as many common distributing relays such as 402, 403 and secondary relays such as 406 are provided as are necessary to close cut-through signaling circuits for all of the trunks incoming to the central office.

Figure 2:
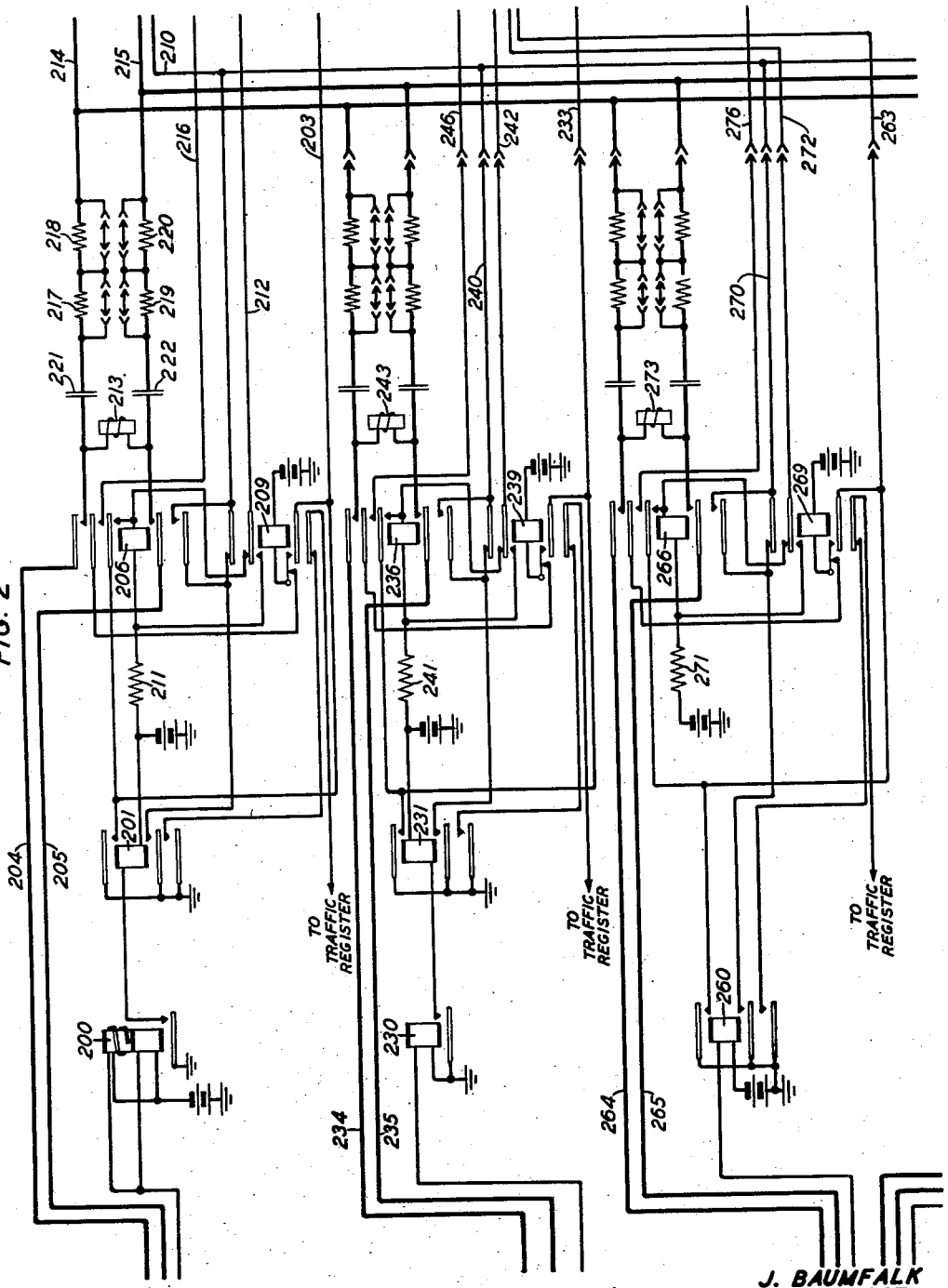
Fig. 2 shows three types of trunks accessible, respectively, from the bank of a final selector in a panel type office, from the calling jack of a manual office and from the bank of a connector switch in a step-by-step office.

It was assumed that a call for time-of-day service has caused the seizure of the incoming trunk disclosed in the upper portion of Fig. 2 and that relay 201 thereof has been operated. With distributing relay 406 now operated a circuit is completed for the cut-through relay 206 of this trunk which may be traced from battery through resistance 211, winding of relay 206, inner upper back contact of relay 209, conductor 212 upper contact of relay 406, conductor 203 to ground at the upper contact of relay 201. Relay 206 now operates locking to ground over its inner upper front contact and the upper contact of relay 201, closing at its upper middle front contact one point in the operating circuit of relay 209, at its lower front contact bridging the upper back contact of relay 209 to insure the continuity of the start circuit over conductor 210 after relay 209 operates and, at its upper and inner lower front contacts, connecting the trunk conductors 204 and 205 to the conductors 214 and 215, respectively, and to the bridged retard coil 213. With the coil 213 now bridged across the trunk conductors 204 and 205 the incoming selector is signaled to advance to the talking position and to release the sender 104. If calls for time-of-day service are also present on other incoming trunks they will be cut through to the central office trunks 214, 215 in a similar manner through the operation of the secondary distributing relays 406, 407, etc.

Relay 607 upon operating also functions to start the timing relays 613 and 614 to cause the measurement of a timing interval during which the call charging equipment of the calling line or lines may become operated before a time pronouncement is transmitted to such line or lines. Relay 614 is a differentially wound relay the right winding of which is energized upon the operation of relay 607 over a circuit extending from ground at the left normal contacts of relay 611, outer right contact of relay 607, back contact of relay 613 and back contact of relay 614 in parallel, upper normal contacts of jack 618, right winding of relay 614, resistance 638, lower normal contacts of jack 618 through resistance 620 to battery. At the same time a circuit is closed from ground at the left normal contacts of relay 611, outer right contact of relay 607, back contact of relay 613 and back contact of relay 614 in parallel, lower normal contacts of jack 619, resistance 637, left winding of relay 614, upper normal contacts of jack 619 through condenser 621 and resistance 620 to battery over which circuit the condenser 621 is charged. So long as charging current flows through the left winding or relay 614, relay 614 will not operate since the windings thereof are energized differentially. However, when condenser 621 becomes fully charged, the charging current ceases to flow through the left winding of relay 614 and relay 614 operates closing the circuit of relay 613 which may be traced from battery through its winding, the front contact of relay 614, thence as traced to ground at the left normal contacts of relay 611.

With relays 614 and 613 both operated current now flows from ground at the left normal contacts of relay 611, outer right contact of relay 607, right front contact of relay 613, lower normal contacts of jack 618, resistance 638, right winding of relay 614, upper normal contacts of jack 618 through resistance 622 to battery and in a parallel path from ground as traced over the right front contact of relay 613 through condenser 621, upper normal contacts of jack 619, left winding of relay 614, resistance 637, lower normal contacts of jack 619 to battery through resistance 622. The current flowing through both windings of relay 614 has now been reversed in direction through the operation of relay 613, but a similar differential condition exists between the windings of relay 614 which prevents this relay from immediately moving its armature to its back contact. However, when relay 614 does finally operate in the reverse direction it opens the circuit of relay 613 which thereupon releases. In this manner relay 613 is intermittently operated, as long as relay 607 remains operated, at a rate determined by the capacitance of condenser 621 and serves as a timed interrupter.

As above stated, the operation of relay 607 caused the incoming trunk circuit to cut through and the charging interval then starts. The first operation of relay 613 establishes the circuit of relay 617 which extends from ground at the left contact of relay 613 through the inner right normal contacts and winding of relay 617, resistance 623 to battery and in parallel therewith through the winding of relay 616 and resistance 624 to battery. Relay 617 operates and locks over its inner right alternate contacts to ground at the contacts of relay 636, but relay 616 does not operate since its winding is shunted by a circuit extending from ground at the left contact of relay 613, the right back contact and winding of relay 616, thence over the inner right normal contacts of relay 617 before relay 617 operates to ground at the left contact of relay 613, or to ground over the inner right alternate contacts of relay 617 after it operates to ground at the contact of relay 636. Relay 617 upon operating opens the circuit previously traced for relays 402, 403, etc. which now release in turn releasing relays 406, 407, etc. to open the cut-through conductors such as 212 of all incoming trunks.

Upon the first release of relay 613 the shunt around the winding of relay 616 is opened and relay 616 now operates in a circuit extending from battery through resistance 624, winding of relay 616, inner right alternate contacts of relay 617 to ground at the contact of relay 636. When relay 613 again operates with relay 616 operated, ground is connected from the left contact of relay 613 over the inner right front contact of relay 616 to a point between resistance 623 and the winding of relay 617 and relay 617 is thereby shunted down transferring the locking circuit of relay 616 to the left front contact of relay 613 and establishing a circuit for operating relay 615 which may be traced from battery through the winding of relay 615, left front contact of relay 616, left normal contacts of relay 617, to ground at the contact of relay 636. Relay 615 upon operating locks over its outer left front contact to ground at the contact of relay 636 and establishes the circuit of distributing relays 410, 411, etc. which are common to all incoming trunks. This circuit may be traced from battery through the windings of these relays, the upper back contacts of transfer relay 400, conductor 412, middle left contact of relay 615 to ground at the outer right front contact of relay 616.

Relays 410, 411, etc. operate in turn causing the operation of secondary distributing relays 413, 414, 415, 416, etc. Each relay such as 413 controls the establishment of cut off relay operating circuits for five incoming trunks and therefore as many common distributing relays such as 410, 411, etc. and secondary relays such as 413 are provided as are necessary to close operating circuits for all of the trunks incoming to the central office. Since the trunk shown in the upper portion of Fig. 2 was assumed to be calling, the operation of relay 413 closes a circuit from ground at its upper contact over conductor 216, middle upper front contact of relay 206, inner lower normal contacts and winding of relay 209 to battery. Relay 209 operates, locks over its inner lower alternate contacts to ground at the upper contact of relay 201, partially opens the start circuit over conductor 210 at its upper back contact and transfers the cut-through conductor 212 from one terminal of the winding of relay 206 to the other terminal of that winding. Similar circuits are also established for other calling trunks through the operation of relays 413, 414, etc.

On the next release of relay 613 the locking circuit of relay 616 is opened and relay 616 releases, opening the circuits of relays 410, 411, etc. which release in turn releasing relays 413, 414, etc. which remove ground from the cut off relay operating conductors of all trunks. When relay 613 again operates, relay 617 operates over the previously traced circuit and with relay 615 locked operated, establishes a circuit for relay 602 which may be traced from battery through the winding of relay 602, right front contact of relay 615 to ground at the left front contact of relay 617.

Relay 602 upon operating closes an obvious circuit for slow-to-release relay 608 over its outer right front contact and closes a circuit for relay 815 extending from battery through resistance 809, winding and upper normal contacts of relay 815, conductor 810 to ground at the outer left contact of relay 602. Relay 815 closes an obvious operating circuit for relay 805. At its inner transfer contacts relay 602 reverses the direction of current flowing over the outgoing trunk 610 through the windings of polarized relay 704 and the windings of relay 703. Relay 815 operates and locks over its upper alternate contacts, the upper normal contacts of release key 811 to ground over the lower back contact of relay 850. Relay 608 upon operating establishes a holding circuit for relay 612 over its outer left contact, opens the initial operating circuit of relay 607 at its back contact, at its inner left contact prepares an operating circuit for relay 625 and at its right front contact establishes an obvious circuit for relay 611. Relay 611 is slow to operate to allow time for recording the battery reversal at the station circuit of Fig. 7 and upon operating releases relay 607 which in turn causes the release of relays 636 and 615, suspends the operation of timing relays 613 and 614 and releases relays 617, 602, 608 and 612 in cascade. Relay 608 upon releasing also releases relay 611.

During the time that relay 602 was operated to reverse the direction of the current flowing over the trunk 610, polarized relay 704 operated to ground conductor 711 at the announcing machine 705 to signal the machine to proceed with the pronouncement. When relay 602 releases, relay 704 also releases to remove ground from conductor 711 whereupon the pronouncement is given. The announcing machine now impresses speech current upon coil 712 which is now bridged through contacts of transfer switches 750 and 706 and through resistances 713 and 714 across the primary or right winding of repeating coil 702 and the shunt resistance 716. This speech current is thereupon inductively impressed through the secondary or left winding of repeating coil 702, over back contacts of transfer relays 700 and 701 and conductors 605 and 606 of trunk 610, upon the primary or right winding of repeating coil 604. With relay 612 now released, the speech current is further impressed through the left windings of repeating coil 604 and through the normal contacts of test jack 501 upon the primary or right winding of repeating coil 502 and thence upon the input circuit of the signal stage amplifier tube 503. The output circuit of the tube 503 is connected through condenser 504 to the primary winding of repeating coil 505, one secondary winding of which is connected to the monitoring jack 506 and the other secondary windings of which are connected in parallel over back contacts of transfer relay 417 to the common incoming trunk conductors 214 and 215 which are connected over contacts of operated cut-through relays such as 206 and thence over the incoming trunks such as 204, 205 to the calling subscribers' lines. The speech current in accordance with the correct time pronouncement is therefore amplified by the amplifying tube 503 and impressed upon each calling subscriber's line.

To prevent cross-talk between subscribers' lines which may be at the same time connected to the common trunk conductors 214, 215, should calling subscribers attempt to talk over the established connection, each incoming trunk such as 205, 204 is provided with series resistances 217 to 220, inclusive, which may be included or excluded by the patching connections indicated to give the best operation, and with series condensers 221 and 222 interposed between the common trunk conductors 214, 215 and the contacts of the cut-through relay 206.

The amplifier tube 503 is a single stage amplifier the input circuit of which is bridged by the potentiometer 507 for regulating the gain in accordance with the output of the announcing machine and the characteristics of the outgoing trunk extending from the central office thereto to obtain the best results. Tube 508 is employed in connection with voice current alarm relay 500 for detecting if speech current is being received from the announcing machine. The filaments of both tubes are lighted in a circuit extending from ground over the upper back contact of transfer relay 404, conductor 418 through ballast lamp 509, which automatically regulates the amount of current flowing through the filaments, resistance 510, filament of tube 508 in parallel with resistance 511, resistance 512, filament of tube 503 in parallel with resistances 513 and 514 through resistances 515 and 516 and the normal contacts of jack 517 to filament battery. Plate potential is supplied to the plate of amplifier tube 503 through the primary windings of repeating coil 505, choke coils 518 and 519 and ballast lamp 520, and plate potential is supplied to the plate of voice current detector tube 508 through the winding of voice alarm relay 500 and ballast lamp 520.

The voice alarm relay 500 is arranged to operate when voice current signals are received from the announcing machine, the grid of tube 508 being biased by a circuit extending through resistance 521, the lower winding of transformer 522, resistance 523, the normal contacts of test key 524, through resistances 513, 514, 515 and 516 and the contacts of jack 517 to negative battery so that if no speech current is being received through the upper winding of transformer 522, which is bridged through condenser 525 across the output of amplifier tube 503, there will be no current flowing in the output circuit of tube 508 for operating voice alarm relay 500. However, if speech current is being received, the output current of tube 503 will be impressed upon the upper winding of transformer 522 thereby lowering the negative bias on the grid of tube 508 to such an extent as to cause the operation of relay 500.

Key 526 is provided to enable a test to be made of the filament activity of the amplifier tube 503. With the key operated resistance 527 is shunted across the filament of the tube and if a filament transmission test set is then connected to test jack 528 and indicates a loss greater than one decibel, the tube is then known to be unsatisfactory. The filament activity test of the speech detector tube 508 is combined with the test of the operation of the voice alarm relay 500. To make this test the key 524 is operated and without speech current present relay 500 should operate. Failure to operate under this condition may indicate either a defective tube or faulty adjustment of relay 500. The test jack 517 is provided for measuring the filament current of the tubes, the resistance 529 and condenser 530 serving to protect the contacts of the jack. The input and output circuits of the amplifier tube may be tested through the test jacks 501 and 528 and monitoring on the amplifier may be done over the monitoring jack 506.

Referring again to the operation of the announcing machine 705, when it has finished the transmission of a time-of-day pronouncement to the calling line or lines and the cam 707 again closes the contacts 709 and 710 short-circuiting one winding of each of relays 703 and 704 then, as previously described, marginal relay 601 again momentarily operates in turn causing the operation and locking of relay 607. If the pronouncement from the machine 705 has been properly received and the speech current detector tube 508 has operated voice current alarm relay 500, relay 815 will have been shunted down by a circuit extending from ground at the lower back contacts of relay 802, over conductor 531, contacts of relay 500, conductor 532 to a point between the winding of relay 815 and resistance 809 and relay 805 will be released and therefore when relay 607 operates as just described, a circuit will be closed from ground over its inner left front contact, back contacts of relays 617, 616 and 615, conductor 808, lower back contact of relay 805 and thence as traced to battery through the windings of distributing relays 402, 403, etc. Relays 402, 403, etc. will therefore operate in turn operating relays 406, 407, etc. which prepare the cut-through conductors such as 212 of all incoming trunks. For example, a circuit is established from ground over conductor 203, the upper contact of relay 406, conductor 212, the upper front contact of relay 209 thence through the winding and inner front contact of cut-through relay 206 to ground at the upper contact of relay 206 thereby causing relay 206 to release and open the trunk circuit. The calling subscriber is now unable to hear a further time pronouncement. Similarly, all other calling subscribers whose lines have been connected to the announcing machine and who have received one complete time pronouncement are cut off.

When the calling subscriber 100 hangs up his receiver the switching equipment including selector switches 105, 106, 107 and 108 is released in the well-known manner, the release of final selector 108 releasing relay 200 which in turn releases relays 201 and 209.

*Automatic transfer—Voice alarm failure*

It will now be assumed that during the period that a time pronouncement should have been sent, the speech current detector tube 508 detected no speech current and therefore voice current alarm relay 500 failed to operate. When therefore relay 607 operated following the pronouncement period, relay 805 will not have been released and therefore the connection of ground to conductor 808 by the operation of relay 607 establishes a circuit over the lower front contact of relay 805, the upper back contact of relay 800, conductor 429, normal contacts of relay 533, conductor 420, winding of relay 804 to battery. Relay 804 operates, locking over the upper back contact of relay 800 and its own inner upper front contact to ground at the middle upper back contact of relay 854, operating the transfer relay 419 over a circuit extending from battery through the winding of relay 419, conductor 421 to ground at the lower front contact of relay 804, establishing an operating circuit for relay 802 extending from battery through the winding of relay 802, upper front contact of relay 804 to ground at the upper front contact of relay 805 and preparing to absorb the next cut-through impulse which will be given from the other outgoing trunk after the transfer thereto has been effected.

Relay 419 upon operating locks over its inner lower front contact and conductor 422 to ground at the lower back contact of relay 854 and, over its outer front contacts closes obvious circuits for transfer relays 417 and 423, relay 423 in turn closing obvious circuits for transfer relays 400 and 404. With transfer relays 400, 404, 417 and 423 all operated a complete transfer of the incoming trunks from the first outgoing trunk disclosed in Figs. 5 and 6 to the second outgoing trunk disclosed in Figs. 9 and 10 is effected: relay 417 transferring the trunk conductors 214, 215 from the secondary windings of repeating coil 505 to the secondary windings of repeating coil 905; relay 404 opening the filament-current supply circuit of tubes 503 and 508 thereby rendering them ineffective and transferring the common distributing relays 402, 403, etc. from their association with cut-through conductor 808, controlled by relay 607 of trunk 610 into association with cut-through conductor 858 controlled by relay 1007 of trunk 1010; relay 400 transferring the common start conductor 210 from its connection over conductor 401 with the winding of start relay 600 of the first outgoing trunk 610 into connection over conductor 424 with the winding of start relay 1000 of the second outgoing trunk 1010 and transferring the common distributing relays 410, 411, etc. from their association with conductor 412 controlled by relay 616 of trunk 610 into association with conductor 425 controlled by relay 1016 of trunk 1010; and relay 423 rendering effective the filament supply circuit of tubes 903 and 908 of the trunk circuit 1010.

Relay 802 upon operating establishes over its lower front contact a new locking circuit for relay 804, removes operating ground from conductors 531 and 609, establishes a circuit for the trouble lamp 534 of the outgoing trunk 610 which may be traced from battery through lamp 534, conductor 535 to ground at the upper transfer contacts of relay 802 and establishes the circuit of alarm relay 849. This latter circuit may be traced from battery through the winding of relay 849, normal contacts of key 848, upper front contact of relay 802 to ground at the upper normal contacts of relay 851. Relay 849 establishes circuits to the floor alarm board.

The removal of ground from conductor 609 releases relay 607 and all relays controlled thereby and the transfer of the common start conductor 210 through the operation of transfer relay 400, from connection with the winding of relay 600 releases relay 600 and relays 703, 704 and 601 if operated whereby the first outgoing trunk circuit is restored to its normal condition. With transfer relay 400 operated the start conductor 210 is now extended over the lower back contact of relay 800, conductor 801, lower front contacts of relay 400, conductor 424 to battery through the winding of start relay 1000. Relay 1000 operates and establishes a circuit over the trunk 1010 which may be traced from ground, left winding of relay 1001, right normal contacts of relay 1002, right winding of differential relay 1003, inner right front contact of relay 1000, upper right winding of repeating coil 1004, tip conductor 1005 of the trunk 1010 thence in parallel over the next-to-upper back contacts of transfer relays 700 and 701, upper left winding of repeating coil 722, in series through the two windings of relay 723 and through the two windings of polarized relay 724, lower left winding of repeating coil 722 thence in parallel over the inner lower back contacts of transfer relays 700 and 701, ring conductor 1006 of trunk 1010, lower right winding of repeating coil 1004, inner left front contact of relay 1000, left winding of relay 1003, left normal contacts of relay 1002, right winding of relay 1001 to battery. Relay 723 now operates, but since the current flows through both windings of differential relay 1003 and is not of the proper polarity or strength, relays 1001, 1003 and 724 do not operate at this time.

Assume that the transfer switch 726 is operated to its lower position to associate the machine 725 with the trunk 1010 then when cam 727 of the machine 725 next closes its contacts thereby shunting the lower winding of polarized relay 724 and the upper winding of relay 723, marginal relay 1001 operates momentarily. Upon operating, relay 1001 establishes a circuit for relay 1007 which extends from battery through the left winding of relay 1007, back contact of relay 1008, normal contacts of relay 1035, contacts of relay 1001, conductor 847, upper back contact of relay 852 to ground at the lower normal contacts of relay 851. Relay 1007 operates, locks over its right winding to ground on conductor 847 under the control of relay 1011, establishes a locking circuit for start relay 1000, causes the operation of relay 1012, causes the operation of relay 1036 and starts the functioning of the timing relays 1013 and 1014 in the manner previously described in connection with the operation of relay 607. Relay 1036 is not effective to cause the operation of the distributing relays 402, 403, etc. and relays 406, 407, etc. to transmit cut-through impulses to the incoming trunks since the circuit for operating relays 402, 403, etc. is at this time open at the inner lower back contact of operated relay 804.

Relays 1017 and 1016 are now operated and released sequentially under the control of timing relay 1013, relay 1017 upon releasing with relay 1016 operated causing the operation and locking of relay 1015. Relay 1015 upon operating establishes the operating circuit for the distributing relays 410, 411, etc. over a circuit extending from battery through the windings of these relays, upper front contacts of transfer relay 400, conductor 425, middle left front contact of relay 1015 to ground at the outer right front contact of relay 1016. Relays 410, 411, etc. operate in turn causing the operation of relays 413, 414, etc. but the latter relays are ineffective at this time since at all incoming trunks which have previously been cut through by the operation of their cut-through relays 206 and whose cut-off relays 209 have been operated, the conductors such as 216 controlled by these distributing relays are open at the inner lower transfer contacts of relay 209 and at other incoming trunks which have subsequently been seized, but whose cut-through relays 206 have not yet been operated the conductors 216 are therefore open at the middle upper contacts of relays 206. Upon the release of relay 1016, relays 410, 411, etc. release in turn releasing relays 413, 414, etc.

When relay 1017 operates a second time under the control of timing relay 1013, with relay 1015 operated, the circuit of relay 1002 is established which may be traced from battery, winding of relay 1002, inner right contact of relay 1015 to ground at the inner left contact of relay 1017. Relay 1002 upon operating closes an obvious circuit for relay 1008 over its outer right front contact, closes a circuit for relay 865 extending from battery through resistance 859, winding and inner upper normal contacts of relay 865, conductor 860 to ground at the outer left contact of relay 1002 and at its inner transfer contacts reverses the direction of current flowing over the outgoing trunk 1010 through the windings of polarized relay 724 and relay 723. Relay 865 operates and locks over its upper alternate contacts, the upper normal contacts of release key 861 and the inner upper back contact of relay 850 to ground and closes an obvious circuit for relay 855. Relay 1008 upon operating establishes a holding circuit for relay 1012, opens the initial operating circuit of relay 1007, prepares an operating circuit for relay 1025 and establishes an obvious operating circuit for relay 1011. Relay 1011 operates after an interval and causes the release of relay 1007 which in turn causes the release of relays 1036 and 1015, suspends the operation of timing relays 1013 and 1014 and releases relays 1017, 1002, 1008 and 1012 in cascade, relay 1008 upon releasing also releases relay 1011.

Relay 855 upon operating, as just described, establishes an operating circuit for relay 803 which may be traced from battery, winding of relay 803, upper back contact of relay 850, lower normal contacts of release key 861, lower transfer contacts of relay 803, middle upper front contact of relay 804 to ground at the inner lower front contact of relay 855. Relay 803 upon operating locks in a circuit as previously traced to its transfer contacts and thereover to ground at the lower front contact of relay 802.

During the time that relay 1002 was operated to reverse the direction of current flowing over trunk 1010, polarized relay 724 operated to ground conductor 731 of the announcing machine 725 to signal the machine to proceed with the pronouncement. When relay 1002 releases, relay 724 also releases to remove the ground from conductor 731 whereupon the pronouncement is given. The machine now impresses speech current on coil 732 which is now connected over the lower contacts of transfer switch 726 with repeating coil 722. The secondary windings of repeating coil 722 are connected over back contacts of transfer relays 700 and 701 to trunk 1010 and thence with the primary windings of repeating coil 1004. The secondary windings of repeating coil 1004 being linked through repeating coil 902 to the input of amplifier tube 903, the speech current is amplified thereby and impressed upon the repeating coil 905 and from thence over front contacts of operated transfer relay 417 upon all incoming trunks which have been associated with the central office through the operation of their cut-through relays 206. If the circuits are functioning properly the calling subscriber whose line 100 has been associated over trunk 204, 205 with the central office should receive the time pronouncement. If speech current is received properly the speech current detector tube 908 will now respond thereby operating speech alarm relay 900. With relay 900 operated, relay 865 is now shunted down over a circuit extending from ground at the lower back contact of relay 852, conductor 931, contacts of relay 900, conductor 932 to a point between the winding of relay 865 and resistance 859 thereby releasing relay 855.

When the announcing machine 725 has finished the transmission of the time-of-day pronouncement and the cam 727 again closes its contacts, relay 1001 is again momentarily operated in turn operating relays 1007 and 1036. Under the assumption that speech current has been properly received and that relay 855 has been released, relay 1036 now closes a circuit from battery through the windings of distributing relays 402, 403, etc., lower front contact of transfer relay 404, conductor 426, upper front contact of relay 803, lower back contact of relay 855, conductor 858, back contacts of relays 1015, 1016 and 1017 to ground at the contact of relay 1036. Relays 402, 403, etc. will now operate causing the operation of relays 406, 407, etc., to transmit cut-through signals to all incoming trunks over conductors such as 212. These signals are effective to release the cut-through relays of all incoming trunks which have received the time pronouncement, or to cut through such trunks as are waiting for the time pronouncement.

Should the speech current detector tube 908 of the trunk 1010 fail to detect speech current and relay 900 not operate, then relay 855 would be operated at the time relay 1036 operated following the announcement period. In this case the connection of ground to conductor 858 by the operation of relay 1036 will complete a circuit over the lower front contact of relay 855, normal contacts of relay 933, inner upper back contact of relay 800, winding of relay 854 to battery. Relay 854 upon operating establishes a circuit for relay 852 extending from battery through the winding of relay 852, lower front contact of relay 854 to ground at the upper front contact of relay 855 and a circuit for relay 853 extending from battery through the winding of relay 853, inner lower back contact of relay 800, lower normal contacts of release key 811, lower transfer contacts of relay 853, inner upper front contact of relay 854 to ground at the inner lower front contact of relay 805. Relay 852 upon operating establishes a locking circuit for relay 854 extending from ground over its lower front contact, inner lower front contact of relay 854, normal contacts of relay 933, inner upper back contact of relay 800 to battery through the winding of relay 854, establishes a locking circuit for relay 853 extending from ground over its lower front contact, the transfer contacts of relay 853, lower normal contacts of key 811, inner lower back contact of relay 800 to battery through the winding of relay 853, establishes a circuit from ground over its inner upper front contact and conductor 935 for lighting the trouble lamp 934 associated with the trunk 1010 and establishes a circuit over its upper front contact for the alarm relay 849.

When the maintenance man in response to the lighting of trouble lamp 534 and the operation of the floor board alarms, clears the trouble on the first trunk 610, he will operate release key 811 thereby opening the locking circuits of relays 815 and 853. Relay 815 upon releasing, releases 805 and 802 in turn releasing relays 803 and 804 and extinguishes the trouble lamp 534. With relay 804 released and relay 854 operated, the operating and locking circuits of transfer relay 419 are opened and relay 419 releases in turn releasing transfer relays 400, 404, 417 and 423. The incoming trunks are now transferred back to the first outgoing trunk 610. Similarly, if the trouble on the second outgoing trunk 1010 is first cleared, the release key 861 is operated thereby releasing relays 865 and 803, relay 865 upon releasing in turn releasing relays 855 and 852 which in turn releases relays 853 and 854 and extinguishes the trouble lamp 934. When the trouble is cleared on both trunks and both relays 802 and 852 have been released, relay 849 releases stilling the floor board alarms.

The floor board alarms may also be silenced by the maintenance man through the operation of key 848.

*Automatic transfer—Line trouble condition*

If certain troubles occur on an outgoing trunk, for example, the trunk 610 so that upon the operation of start relay 600 the differential relay 603 operates, a circuit is established from ground over its contacts and conductor 626 through the winding of relay 807 to battery. Relay 807 upon operating locks in a circuit over its lower front contact, the upper normal contacts of release key 811 to ground at the lower back contact of relay 850, establishes a circuit from ground over its inner upper front contact for relay 802 and a circuit over its upper front contact, the upper back contact of relay 800, winding of relay 804 to battery. With relays 802 and 804 operated, transfer relays 400, 404, 417, 419 and 423 are operated and the incoming trunks are then transferred into connection with the second outgoing trunk in the manner described. Relay 802 upon operating also causes the trouble lamp 534 associated with trunk 610 to be lighted and the floor board alarm relay 849 to be operated.

If troubles occur on the second outgoing trunk 1010, relays 1003, 857, 852 and 854 operate in a similar manner and the trouble lamp 934 associated with trunk 1010 is lighted. After the trouble is found and eliminated the circuits are restored to their original condition by the operation of either release key 811 or 861 dependent on the trunk upon which the trouble has occurred.

*Automatic transfer—Timed trouble condition*

If after the operation of the start relay of an outgoing trunk circuit, for example relay 600, and the operation of relay 602 to transmit a signal to the announcing machine 705 to start the pronouncement period, too long a period elapses before a cut-through signal is registered by the operation of relay 636, which may result from a failure of the announcing machine or equipment of the trunk at the central office, provision is made for causing the automatic transfer of incoming trunks to the other outgoing trunk 1010.

When the start relay 600 operates, as soon as battery is connected from the common timing circuit, a circuit is completed over interrupter contacts 1039, conductor 627, winding of pick-up relay 629, back contact of relay 630, right normal contacts of relay 625, conductor 631, back contact of relay 807, conductor 32 to ground at the outer right front contact of relay 600. Relay 629 operates and locks to battery over its inner left front contact. If the trunk circuit operates satisfactorily, relay 602 will be operated from the announcement machine 705 in turn operating relay 608 as previously described and relay 608 will establish a circuit from ground over its inner left front contact, right winding of relay 625 to battery over the outer left front contact of relay 629. Relay 625 upon operating locks in a circuit from battery over the outer left contact of relay 629, left winding and inner left front contact of relay 625, conductor 633 normal contacts of monitoring jack 506, conductor 427 to ground at the back contacts of distributing relays 406, 407, etc., and closes an obvious circuit for relay 630. Relay 630 operates and locks over its left contact to ground over the inner right contact of relay 629 and opens the locking circuit of relay 629 but with relay 625 operated, relay 629 is maintained operated in a circuit from battery over its inner left front contact and winding, right transfer contacts of relay 625 thence as traced to ground at the outer right contact of start relay 600.

At the end of the transmission of the pronouncement signal to the announcing machine which occurs upon the release of relays 602 and 608 and the subsequent operation of relay 636 thereby operating relays 413, 414, etc., the operating and locking circuits of relay 625 will be opened and relay 625 will release and cause the release of relay 629 which will be followed by the release of relay 630.

If, however, trouble occurs and relays 625, 629 and 630 do not release before ground becomes connected from the timing interrupter contacts 1040 a circuit is completed therefrom over conductor 628, the right front contact of relay 629, conductor 634, conductor 626 to battery through the winding of relay 807. Relay 807 upon operating causes the operation of relays 802 and 804, the operation of transfer relays 400, 404, 417, 419 and 423 to transfer the incoming trunks to the second outgoing trunk 1010 and to light the trouble lamp 534. In a similar manner, relays 1025, 1029 and 1030 function under the control of the common timing circuit if the trouble conditions arise in connection with trunk 1010 and the announcing machine 725.

*Automatic switch-over at announcer machine*

If both outgoing trunks or announcement channels fail to operate and cause the lighting of trouble lamps 534 and 934 associated therewith in the manner previously described, the trouble may be due to faulty station equipment in one channel and trunk or central office trouble in the other channel. For this reason provision is made to send a signal to the station to cause the interchange of the two trunks and associated announcing machine. Under this condition both relays 802 and 852 will be operated and will close a circuit for relay 846 extending from battery, winding of relay 846, upper back contact of relay 845, inner lower front contact of relay 852, inner lower front contact of relay 802 to ground. Relay 846 upon operating locks over its lower front contact and the front contacts of relays 802 and 852 independent of relay 845 and closes an obvious operating circuit for relay 851 and an operating circuit for relay 845. This latter circuit may be traced from ground over the upper front contact of relay 846, the transfer contacts and winding of relay 845 to battery. Relay 851 upon operating removes ground from conductors 609 and 847 over which relays 607 and 1007 are operated and locked and establishes an obvious operating circuit for slow-to-operate relay 850. Relay 845 upon operating locks over its transfer contacts under the control of release key 844, closes the circuit of lamp 843, opens at its upper back contact the initial operating circuit for relay 846, closes at its inner upper front contact a holding circuit for alarm relay 849 and at its middle upper front contact establishes a circuit from battery through resistance 842 over conductor 839 through the windings of transfer relays 700 and 701 at the announcer station to ground. Relays 700 and 701 upon operating effect a transfer of trunks 610 and 1010 from their respective association with announcing machines 705 and 725 to machines 725 and 705.

Relay 850 is somewhat slow to operate in order to allow sufficient time for relays 846 and 851 to become magnetically saturated and then upon operating establishes an obvious circuit for relay 800, disconnects ground from contacts of release keys 811 and 861 and opens the circuit of relay 803 which now releases. The removal of ground from the contacts of keys 811 and 861 now causes relays 815 and 865 to release in turn releasing relays 805 and 855 and causing relays 807 and 857 to release if they have been operated. The operation of relay 800 opens at its lower back contact the start conductor 210, at its inner lower back contact opens the circuit of relay 853, at its inner upper back contact opens the circuit of relay 854 and at its upper back contact opens the circuit of relay 804. Relays 804, 853 and 854 now release.

The above described operations cause the release of relays 802 and 852 and all operated relays of Figs. 6 and 10. Relays 802 and 852 upon releasing open the locking circuit of relay 846 which releases in turn releasing relays 851, 850 and 800 to permit another trial of both trunks or channels to be made with the announcing machine 705 now connected to trunk 1010 and machine 725 connected to trunk 610 through the operation of transfer relays 700 and 701. Relays 846 and 851 are made slow to release to permit the other relays of the circuit sufficient time to release as just described. The second trial of both channels is now made in the manner previously described, but since relay 845 is locked operated under the control of key 844, if a failure results on both channels on the second trial, the operation of relays 802 and 852 is ineffective to cause the reoperation of relay 846. Relay 845 remains operated until the trouble on both channels is cleared at which time the maintenance man will operate key 844. No provision is made to prevent interference with a call when key 844 is operated so therefore it should be operated when there are no calls in progress.

*Manual transfer*

If the maintenance man desires to transfer from one channel to the other he may do so by operating either the key 812 or key 862. To transfer from the first channel or trunk 610 to the second channel or trunk 1010, key 812 will be operated thereby causing the operation of relay 806. If there is no call in progress and therefore start relay 600 is not operated, a circuit is established at once from ground over the outer left back contact of relay 600, conductor 813, lower front contact of relay 806, upper back contact of relay 800, winding of relay 804 to battery thereby resulting in the operation of the transfer relays 400, 404, 417, 419 and 423 and the immediate transfer of the incoming trunk to the second channel or trunk 1010 in the manner previously described.

If, however, there is a call present and relay 600 is operated, relay 806 is locked when it operates over its upper front contact and conductor 814 to the outer left front contact of relay 600 and relay 804 is not therefore operated until conductor 813 becomes grounded through the operation of relays 615 and 616 which will not occur until after a pronouncement that may be in progress has been completed so that there will be no interference with such pronouncement.

Should the second channel or trunk 1010 be in service and the maintenance man desire to transfer incoming trunks to the first channel or trunk 610, he may do so by operating transfer key 862 thereby operating relay 856 to cause the operation of relay 854, relay 854 upon operating, releasing relay 804 and causing the release of transfer relays 400, 404, 417, 419 and 423. These transfer relays upon releasing will therefore transfer the incoming trunks from the first to the second channel.

*Operating test of either channel*

An operating test of either channel may be made by plugging a monitoring receiver into the monitoring jack of the channel to be tested. For example, should a test of the first channel of trunk 610 be desired, the maintenance man will plug into monitoring jack 506 whereby the monitoring receiver will be connected to the first secondary winding of repeating coil 505 and a circuit will be established for relay 533 extending from battery through the winding of this relay, contacts of jack 506, conductor 536 to ground at the inner upper back contact of relay 802. Relay 533 upon operating will connect starting ground over conductor 401 for operating start relay 600 of the channel, supply filament ground over its middle left contact for the tubes 503 and 508 of the channel, open the operating circuit of relay 804 at its outer left contact and at its inner contacts prepares circuits for lamps 840 and 841. If the circuits of the first channel function correctly the cut-through signal transmitted for operating distributing relays 402, 403, etc., as previously described, will now light lamp 841 over a circuit from ground applied to conductor 808 by the operation of relay 636, lower back contact of relay 805, upper back contact of relay 854, conductor 405, inner left front contact of relay 533, conductor 537 through lamp 841 to battery indicating that the cut-through signal has been properly received. Also, the signal transmitted for operating distributing relays 410, 411, etc. will now light lamp 840 over a circuit extending from ground applied to conductor 412 upon the operation of relays 615 and 616, thence over the inner right contact of relay 533, conductor 538 to battery through lamp 840 indicating that the signal has been properly transmitted and the pronouncement will then be heard in the monitoring receiver. When the monitoring receiver plug is removed from jack 506, relay 533 will release thus restoring the circuits to normal.

Should the maintenance man monitor upon the second channel, relay 933 will be similarly operated to close the filament circuit of the tubes 903, and 908, to close the start circuit extending through the winding of relay 1000 of the second channel, to open the operating circuit of relay 854 and to prepare the circuits of lamps 840 and 841. When the cut-through signal is transmitted to relays 402, 403, etc. by the grounding of conductor 858 as previously described, the circuit of lamp 841 will be established from ground on conductor 858, thence over the lower back contact of relay 855, inner lower back contact of relay 804, inner left front contact of relay 933, conductor 537 to battery through lamp 841. When the signal is transmitted to relays 410, 411, etc. by the grounding of conductor 425, the circuit of lamp 840 will be established over the inner right front contact of relay 933, conductor 538 to battery through lamp 840. If these lamps light momentarily in succession followed by the reception of a pronouncement in the monitoring receiver, the maintenance man will know that the channel is functioning properly.

Use of apparatus in a manual exchange area

In the foregoing description the circuits were described in connection with their use in an exchange area served by panel type equipment. Should they be installed in an exchange of the manual type access thereto from manual subscribers' lines, such as illustrated at 110 of Fig. 1, would be had over a cord circuit 111 at the manual switchboard and a trunk such as 234, 235. In this case upon the seizure of the trunk, sleeve relay 230 is operated in turn causing the operation of relay 231 which establishes the circuit of a traffic register, if required, connects ground to the start conductor 240 which is in this case patched to start conductor 210 and prepares the operating circuit of cut-through relay 236, all in the manner previously described in connection with trunk 204, 205.

Upon the receipt of the cut-through signal from the central office over conductors 233 and 242, relay 236 operates, locks, cuts through the trunk 234, 235 to the retard coil 243 for tripping the ringing and cuts the trunk through to the conductors 214, 215 for the reception of the time pronouncement. When a signal is transmitted from the central office over conductor 246 with relay 236 operated, the cut-off relay 239 operates. At the central office the circuits function in the manner previously described with the following exception, that since manual offices have no equipment for obtaining a desired time interval for causing the automatic transfer on timed trouble conditions, the conductors 627 and 628 are patched to conductors 1127 and 1128 extending to the timing circuit of Fig. 11. This timing circuit is provided with an alternating current relay 1100 which operates during the usual two-second ring interval and is normal during the four-second silent interval from the source of ringing current 237 in the manual office, but is ineffective unless relay 1101 is operated.

Whenever a call is received on one of the channels or outgoing trunk circuits and either start relay 600 or start relay 1000 is operated, a circuit is established through one of the windings of relay 1101 causing its operation. For example, if the first trunk 610 is in service and start relay 600 is operated, the operating circuit of relay 1101 extends from ground at the outer left front contact of relay 600, over conductor 814, conductor 1102 to battery through the left winding of relay 1101, or if the second trunk 1010 is in service and start relay 1000 is operated, the operating circuit of relay 1101 extends from ground at the outer left front contact of relay 1000 over conductor 864 conductor 1103 to battery through the right winding of relay 1101. When relay 1101 operates, on the next operation of relay 1100 releasing the slow-to-release relay 1104, a circuit is established from ground at the front contact of relay 1101, right normal contacts of slow-to-release relay 1105, conductor 1120, front contact of relay 1100, normal contacts of relay 1104, normal contacts and winding of relay 1106, resistance 1108 to battery and in parallel over the left normal contacts of relay 1106, winding of relay 1107, resistance 1109 to battery. Relay 1106 operates, locking over its left transfer contacts to ground on conductor 1120 but relay 1107 being shunted by the operating ground connected to its left back contact does not operate at this time. Relay 1106 upon operating establishes an operating circuit for relay 1110 extending from battery, winding of relay 1110, right back contact of relay 1111, right contact of relay 1106 to ground at the right back contact of relay 1112. Relay 1110 upon operating connects battery to conductor 1127 strapped to conductor 627 for the purpose hereinbefore described.

On the next release of relay 1100, the shunt is removed from the winding of relay 1107 and it operates in a circuit from battery through resistance 1109, winding of relay 1107, the transfer contacts of relay 1106, to ground on conductor 1120. Relay 1104 also operates in a circuit extending from ground on conductor 1120 over the back contacts of relay 1100 and opens the circuit from the front contact of relay 1100 so that should relay 1100 operate momentarily on the application of the silent period of battery in the ringing circuit, the timing operation will be unaffected. Relay 1107 upon operating establishes an operating circuit for relay 1115 extending from battery through resistance 1117, winding and right normal contacts of relay 1115, right front contact of relay 1107 to ground on conductor 1120 and in parallel over the right normal contacts of relay 1115 through the winding of relay 1116 and resistance 1118 to battery. Relay 1115 operates, but relay 116 does not since its winding is shunted by the operating ground supplied over its right back contact through the right front contact of relay 1107.

Relay 1115 upon operating locks over its right transfer contacts to ground on conductor 1120 independent of the continued operation of relay 1107 and establishes a circuit from ground through its left front contact, the left transfer contacts and winding of relay 1111 through resistance 1113 to battery and in parallel through the winding of relay 1112 and resistance 1114 to battery. Relay 1111 operates locking over its left transfer contacts to ground on conductor 1120, but relay 1112 does not operate since its winding is shunted so long as relay 1115 remains operated by ground connected to its winding over its left back contact. Relay 1111 at its right back contact opens the circuit of relay 1110 which releases, removing battery from conductor 1127.

On the next operation of relay 1100, relay 1104 releases and ground from conductor 1120 is connecter over its front contact, the normal contacts of relay 1104, the left front contact of relay 1107 to a point between the winding of relay 1106 and resistance 1108 whereupon relay 1106 releases. Relay 1107 is now held operated in a circuit from battery through resistance 1109, winding of relay 1107, normal transfer contacts of relay 1106, normal contacts of relay 1104, front contact of relay 1100 to ground on conductor 1120 until relay 1100 again releases when relay 1107 will release. When relay 1107 releases it removes shunting ground from the winding of relay 1116 whereupon relay 1116 operates. Upon the next operation of relay 1100, relay 1106 again operates and locks, but is ineffective to reclose the circuit of relay 1110 since relay 1111 is now operated. On the next release of relay 1100, relay 1107 operates in the manner previously described and with relay 1116 now operated closes a circuit for shunting down relay 1115 which may be traced from ground on conductor 1120, right front contact of relay 1107, right front contact of relay 1116 to a point between resistance 1117 and the winding of relay 1115. Relay 1115 thereupon releases removing shunting ground from the left back contact of relay 1112 whereupon relay 1112 operates in a circuit extending from battery through resistance 1114, winding of relay 1112, transfer contacts of relay 1111 to ground on conductor 1120. Relay 1112 upon operating further opens the operating circuit of relay 1110.

On the next operation of relay 1100, relay 1106 is again shunted down and on the next release of relay 1100, relay 1107 is released, opening at its right contact the locking circuit of relay 1116 which now releases. On the next operation of relay 1100, relay 1106 is again operated and on its next release of relay 1107 operates in turn reoperating relay 1115 which establishes a shunt for the winding of relay 1111 extending from ground at its left front contact, inner left front contact of relay 1112 to a point between the winding of relay 1111 and resistance 1113. Relay 1111 now releases and with relay 1112 operated, establishes a circuit from ground over the outer left front contact of relay 1112, inner left back contact of relay 1111, winding of relay 1105 to battery. Relay 1105 now operates removing ground from conductor 1120 thereby releasing the operated relays 1106, 1107, 1112 and 1115 and connects ground over its left front contact to conductor 1128 strapped to conductor 628. Relay 1112 upon releasing opens the operating circuit of relay 1105 which then releases, but being slow to release maintains ground on conductor 1128 for a sufficient interval.

Thus, through the operation of the relays of Fig. 11 battery is first supplied to conductors 1127 and 627 for operating either the pick-up relay 629 or 1029 followed after a predetermined interval by the application of ground to conductors 1128 and 628 for operating either relay 807 or 857 in the manner previously described.

*Use of circuits in a step-by-step exchange area*

Figure 3:
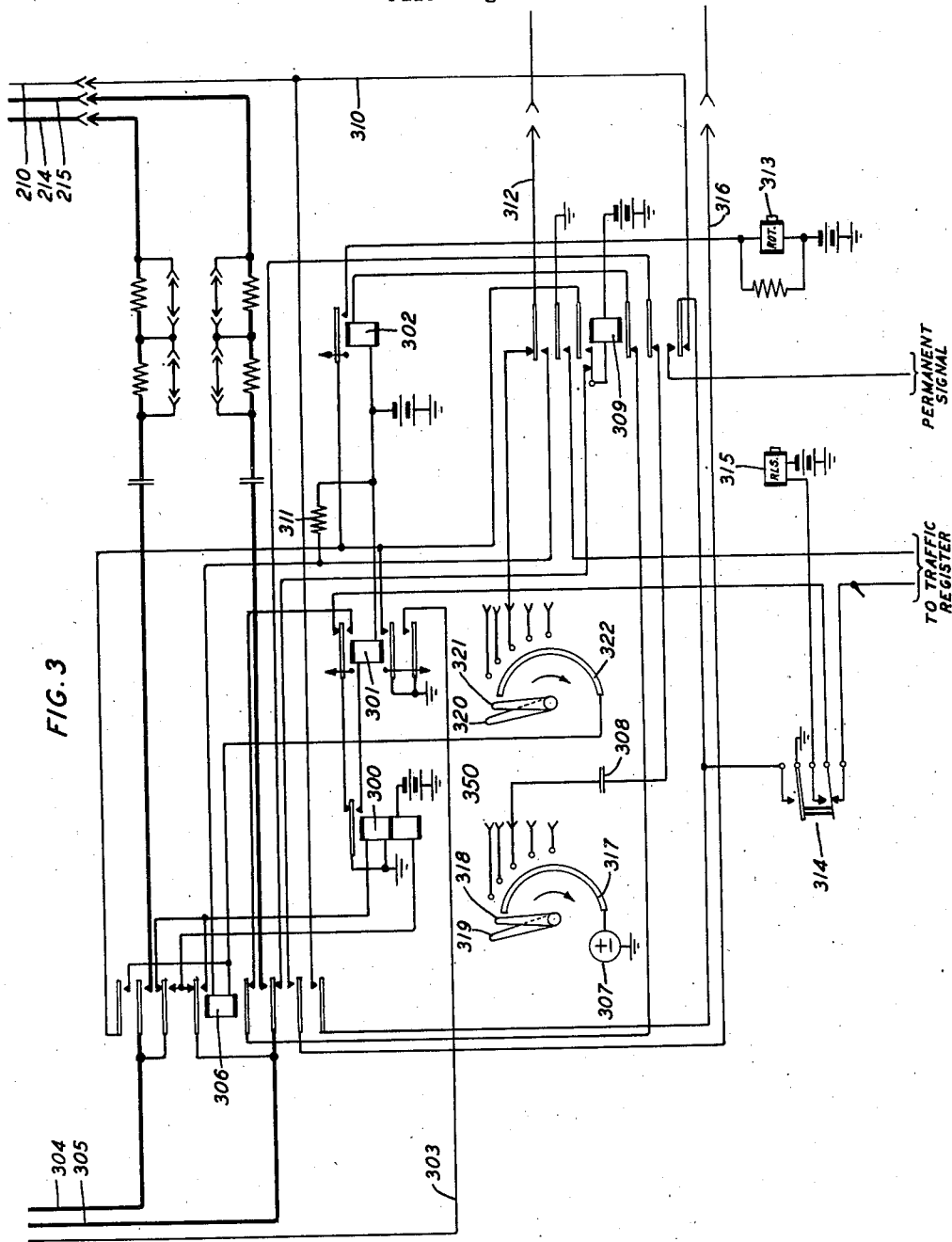
Fig. 3 shows a trunk accessible from the bank of a selector switch of a step-by-step office.
Figure 4:
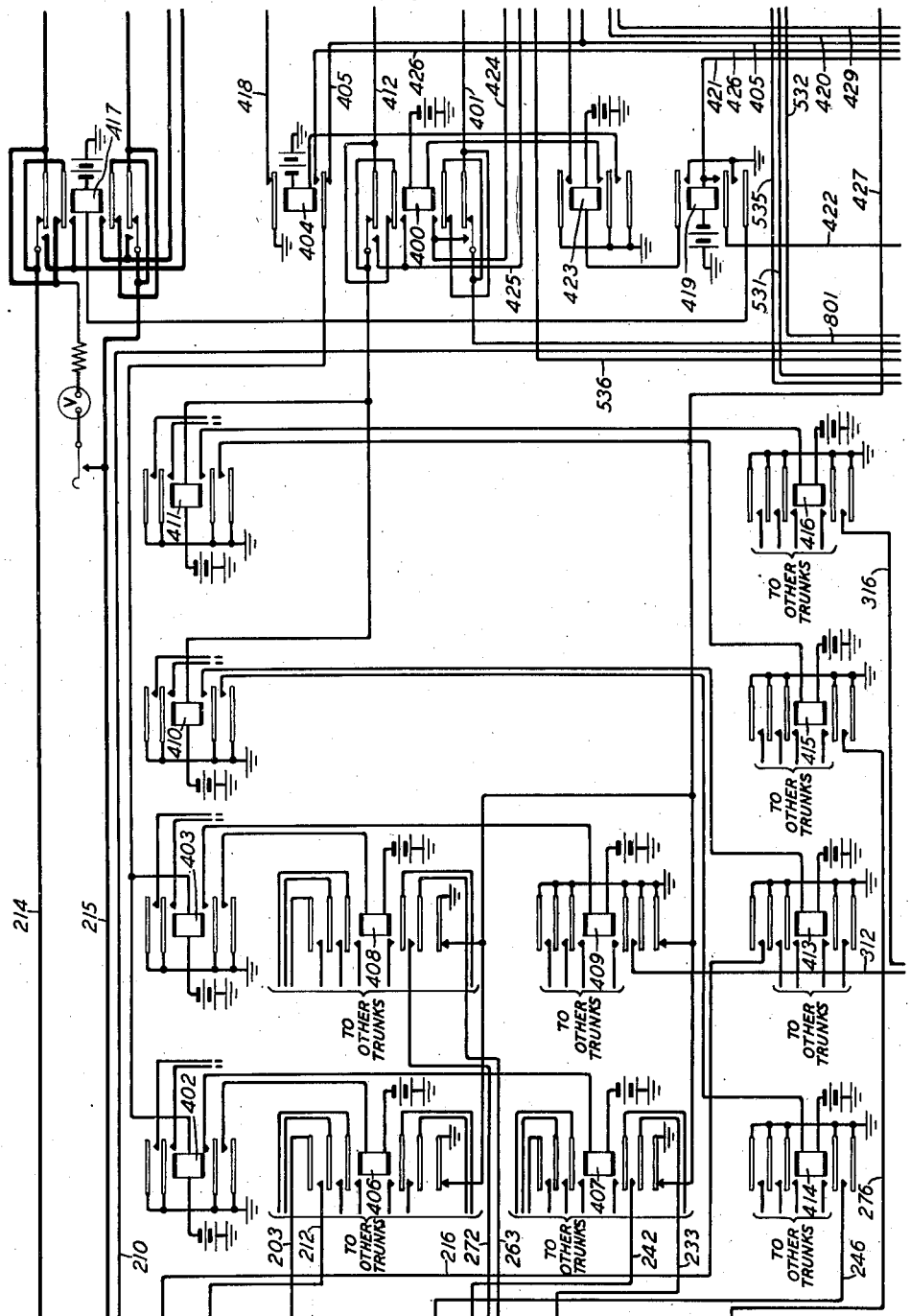
Fig. 4 shows a transfer and distributing circuit to which trunks from any one of the offices shown in Figs. 2 and 3 may be multipled.

Should the circuits be installed in a step-by-step exchange area access thereto may be had over step-by-step selector circuits and trunks such as are disclosed either in the lower portion of Fig. 2 or in Fig. 3. The selector circuit for extending connections from a calling subscriber's line such as 120 may comprise a line finder 121, first selector 122, second selector 123, third selector 124 and connector 125 of the well-known type, access being had to trunks extending to the central office equipment from the banks of connector switches, or if desired, from the banks of selector switches.

It will first be assumed that the trunks extending to the central office equipment are terminated in the banks of connector switches, one such trunk 264, 265 being disclosed in the lower portion of Fig. 2 as terminating in the bank of connector switch 125. When the calling subscriber 120 has, by dialing the directory number for time-of-day service, set the connector switch 125 upon the trunk 264, 265, the circuit of sleeve relay 260 is established from ground over the sleeve brush 126 of connector 125, terminal 127 to battery through the winding of relay 260. Relay 260 upon operating prepares at its upper front contact the operating circuit for cut-through relay 266, closes at its lower contact the circuit of a traffic register, if required, and establishes a start circuit extending to the central office equipment.

The start circuit may be traced from ground over the inner lower front contact of relay 260, upper back contact of relay 269, conductor 270, patched to conductor 210, and thence as traced to battery through the winding of start relay 600 or start relay 1000 dependent on which channel is at the time in service. When the cut-through signal is transmitted from the central office in the manner previously described, a circuit is completed from ground applied from the upper contact of relay 260, conductor 263, lower front contact of relay 408, conductor 272, inner upper back contact of relay 269, winding of relay 266 to battery through resistance 271. Relay 266 upon operating cuts through the connection extended from the subscriber's line 120 over trunk 264, 265 to the bridged retard coil 273 which serves as a holding bridge to hold the established connection and to the trunk conductor 214, 215 extending to the central office.

When the central office equipment transmits a signal by grounding conductor 276, relay 269 operates followed on the transmission of the next cut-through signal by the release of cut-through relay 266 in the manner previously described in connection with the functioning of relays 209 and 206.

The central office equipment functions in the manner previously described except that the required time interval for causing the automatic transfer on timed trouble conditions is obtained from equipment located in the step-by-step office connected to conductors 1027 and 1028 and patched to conductors 627 and 628, respectively, for supplying a battery impulse to conductor 627 followed at a predetermined interval thereafter by the application of a ground impulse to conductor 628.

In some cases it may be desirable to terminate the trunks extending to the central office equipment in the banks of selector switches rather than in the banks of connector switches. In this event provision is made in the trunk circuit for absorbing some of the digits dialed in order that the same directory number for time-of-day service may be assigned to several offices of the exchange area. A trunk circuit of this character is disclosed in Fig. 3 and is provided with a minor step-by-step switch for absorbing any desired number of dialed digits. This trunk is disclosed as terminating in the bank of second selector 123.

When the trunk is seized by the second selector, a dialing circuit is established from the calling line, such as 120, which may be traced from ground through the upper winding of line relay 300, upper back contact of cut-through relay 306, tip conductor 304 of the trunk, tip brushes of selector switches 123 and 122, tip brush of line finder 121 through the substation circuit, returning over the ring brushes of line finder 121 and selectors 122 and 123, ring conductor 305 of the trunk, inner upper back contact of relay 306 to battery through the lower winding of relay 300. Relay 300 operates establishing a circuit from ground over its front contact, winding of slow-to-release relay 301 to battery. Relay 301 operates preparing the circuit of slow-to-release relay 302 over its upper front contact and applying holding ground to sleeve conductor 303 of the trunk to mark the selected trunk as busy to other second selectors.

When the calling subscriber dials the third digit of the directory number relay 300 follows the dialed impulses and upon each release establishes an operating circuit for relay 302 extending from ground over its back contact, upper front contact of relay 301, inner lower back contact of relay 306, inner lower back contact of relay 309, winding of relay 302 to battery. Relays 301 and 302 are both slow to release, relay 301 remaining operated during the transmission of all impulses, or until relay 300 is finally released when the calling subscriber hangs up his receiver to terminate the call, and relay 302 remaining operated during the transmission of any single series of impulses, or until relay 300 remains operated at the termination of a series of impulses. When relay 302 operates during the reception of the first series of dialed impulses it establishes a circuit for the rotary magnet 313 which may be traced from battery, winding of magnet 313, front contact of relay 302 to ground at the inner lower front contact of relay 301. Upon the termination of the first series of impulses, at which time line relay 300 remains operated for a short interval, relay 302 releases opening the circuit of magnet 313 which thereupon advances the wipers of the minor switch 350 one step.

In a similar manner in response to the dialing of further series of impulses, the wipers of the minor switch are advanced step by step. It will be assumed that the terminals of the arcs of the minor switch are so connected that three series of dialed impulses are absorbed. Therefore, in response to the dialing of the fifth and last digit of the directory number, the wipers of the minor switch will have been advanced into engagement with the third terminals of their arcs. A circuit will now be established from the source of ringing current 307 over segment 317, wipers 318 and 319, the third arc terminal with which wiper 319 is now in engagement, condenser 308, middle lower back contact of relay 309, lower back contact of relay 306 to the ring conductor 305 of the trunk whereby a ringing tone is transmitted to the calling subscriber's substation as a signal that a trunk outgoing to the central office has been seized. As soon as the minor switch moved off normal a start circuit was extended to the central office equipment from ground over the upper contacts of off-normal switch 314, lower back contact of relay 309, conductor 310 patched to conductor 210, and thence to battery through the winding of start relay 600 or start relay 1000 dependent upon which channel is in service at the central office.

When the central office equipment transmits a cut-through signal in the manner previously described, ground is applied to conductor 312 thereby completing a circuit over the upper back contact of relay 309, the third terminal of the arc with which the wipers 320 and 321 of minor switch 350 are associated, wipers 321 and 320, segment 322, winding of cut-through relay 306, resistance 311 to battery. Relay 311 now operates locking over its upper front contact to ground at the inner lower front contact of relay 301, reversing the connection of the windings of relay 300 to trunk conductors 304 and 305 for supervisory and call charging purposes, disconnecting the source of ringing tone from trunk conductor 305, preparing the operating circuit of relay 309 and cutting through the trunk conductors 304 and 305 to conductors 214 and 215 extending to the central office.

When the central office equipment subsequently transmits a cut-off signal, as previously described, ground is connected to conductor 316 thereby completing a circuit therefrom, next-to-lower front contact of relay 306, inner upper transfer contacts and winding of relay 309 to battery. Relay 309 now operates locking over its transfer contacts to ground at the inner lower front contact of relay 301, further opening the ringing tone signal circuit at its next-to-lower back contact, opening the operating circuit of relay 302 at its inner lower back contact and, at its upper front and back contacts, transferring conductor 312 from one terminal of the winding of relay 306 to the other terminal thereof. When a subsequent cut-through signal is transmitted over conductor 312 following the termination of the transmission of a complete time pronouncement, ground applied from conductor 312 over the upper front contact of relay 309 to a point between the winding of relay 306 and resistance 311 shunts down relay 306 which now releases cutting off the subscriber's line from the central office equipment. Relay 306 cannot be again operated on this call.

When the calling subscriber hangs up, the line finder 121 and selector switches 122 and 123 are restored to normal in the usual manner and relay 300 is released in turn releasing relays 301 and 309. Relay 301 upon releasing now establishes a circuit for release magnet 315 which may be traced from battery through the winding of magnet 315, lower contacts of off-normal switch 314, upper back contacts of relays 301 and 300 to ground. The operation of magnet 315 releases the minor switch 350 which returns its wipers to normal whereupon the off-normal switch 314 is restored to normal position thereby releasing magnet 315.

*Manual pronouncement*

Provision is made for making manual pronouncements under emergency conditions when both announcement machines are out of service due to power failure or other causes. In this event the transfer switches 706 and 726 of Fig. 7 are both operated to their upper positions and transfer switch 750 is operated to the left thereby associating the manual equipment shown in the upper right portion of Fig. 7 with both trunks or channels. Operating current is then supplied to conductor 754 of the manual equipment from a storage battery or dry cell 751 over the upper contacts of switch 750.

When a call is now received on either trunk and either relay 703 or 723 is operated, a circuit is established for the call waiting lamp 752. If it be assumed that a call is incoming on trunk 605, 606 and relay 703 operates, the circuit of lamp 752 may be traced from ground at the contacts of relay 703, contacts of switch 706, third from top left contacts of switch 750, lamp 752 to battery on conductor 754. Upon noting this signal the manual operator will momentarily operate the answer key 755. The operation of key 755 performs the same function as the cam operated contacts of either one of the announcing machines, which is, the short-circuiting of the high resistance windings of either relays 703 and 704 or of relays 723 and 724. It having been assumed that the call is waiting on the upper trunk or channel, the operation of key 755 closes a short circuit for the upper windings of relays 703 and 704 extending from the midpoint between the windings of relay 704, contacts of switches 706 and 750, lower contacts of key 755, contacts of switches 750 and 706 to the midpoint between the windings of relay 703.

The operator then waits until the announcing lamp 756 lights which occurs when either relay 704 or 724 operates, as previously described. For example, when relay 704 operates it closes a circuit extending from ground at its contacts, over contacts of switches 706 and 750 through lamp 756 to battery on conductor 754. After the lamp has been lighted and extinguished the operator proceeds to make the pronouncement, talking current being supplied to her transmitter 757 from battery 751, through the windings of retard coil 758 and speech current being applied from the transmitter through the windings of repeating coil 766 and over the contacts of switch 759 and either switch 706 or 726 to the channel on which the call is incoming. The automatic transfer from one channel to the other on trouble conditions will continue to function under the manual announcement condition.

What is claimed is:

1. In a telephone system, an incoming trunk, a station having an announcing machine thereat, two equivalent trunks outgoing to said station, means for connecting said incoming trunk with either one of said outgoing trunks, means responsive to the seizure of said incoming trunk for transmitting a start signal over the outgoing trunk to which said incoming trunk is connected for starting said announcing machine, and means operable a predetermined interval following the transmission of said start signal if said machine fails to start for automatically transferring said incoming trunk into connection with the other outgoing trunk.

2. In a telephone system, an incoming trunk, a station having an announcing machine thereat, two equivalent trunks outgoing to said station, means for connecting said incoming trunk to either one of said outgoing trunks, a timing device, means responsive to the seizure of said incoming trunk for transmitting a start signal over the outgoing trunk to which said incoming trunk is connected for starting said announcing machine and for starting said timing device, means controlled upon the starting of said machine for transmitting a cut-through signal over said outgoing trunk to said incoming trunk for completing a speech transmission circuit from said incoming trunk to said machine, and means operable by said timing device if said cut-through signal is not received within a predetermined interval for automatically transferring said incoming trunk into connection with the other outgoing trunk.

3. In a telephone system, an incoming trunk, a station having two announcing machines thereat, two equivalent trunks outgoing to said station and each normally connected to one of said machines, means for connecting said incoming trunk to either one of said outgoing trunks, means responsive to a trouble condition on the outgoing trunk to which said incoming trunk is connected for automatically transferring said incoming trunk into connection with the other outgoing trunk, means operative if a trouble condition is then encountered on said other outgoing trunk for transferring said incoming trunk to said first outgoing trunk and for reversing the connection of said outgoing trunks to said machines at said station.

4. In a telephone system, an incoming trunk, a station having an announcing machine thereat, two equivalent trunks outgoing to said station, means for connecting said incoming trunk to either one of said outgoing trunks, manually operable means for controlling the transfer of the incoming trunk from the outgoing trunk with which it is connected into connection with the other outgoing trunk, and means controlled by said machine for rendering said transfer ineffective during a pronouncement period.

5. In a telephone system, a plurality of incoming trunks, a station having an announcing machine thereat, a trunk outgoing to said station, means for connecting said incoming trunks in multiple to said outgoing trunk, means responsive to the seizure of any of said incoming trunks for transmitting a start signal over the outgoing trunk for starting said machine, means controlled upon the starting of said machine for transmitting a cut-through signal to such of said incoming trunks as are at the time in a calling condition for completing speech transmission circuits from said incoming trunks to said machine, and means operative a predetermined interval thereafter for transmitting a second signal over said outgoing trunk to initiate the transmission of a pronouncement from said machine.

6. In a telephone system, a plurality of incoming trunks, a station having an announcing machine thereat, a trunk outgoing to said station, means for connecting said incoming trunks in multiple to said outgoing trunk, means responsive to the seizure of any of said incoming trunks for transmitting a start signal over the outgoing trunk for starting said machine, means controlled upon the starting of said machine for transmitting a cut-through signal to such of said incoming trunks as are at the time in a calling condition for completing speech transmission circuits from said incoming trunks to said machine, means operative a predetermined interval thereafter for transmitting a second signal over said outgoing trunk to initiate the transmission of a pronouncement from said machine, and means operative following the completion of a single announcement for opening the speech transmission circuits at said incoming trunks.

7. In a telephone system, a plurality of incoming trunks, an outgoing trunk to which said incoming trunks are connected in multiple, a station having an announcing machine thereat in which said outgoing trunk terminates, means responsive to the sizure of any of said incoming trunks for transmitting a start signal over the outgoing trunk for starting said machine, a cut-through relay associated with each of said incoming trunks, means controlled upon the starting of said machine for operating the cut-through relays of such of said incoming trunks as are at the time in a calling condition, a cut-off relay at each of said incoming trunks, means operative a predetermined interval after the starting of said machine for operating the cut-off relays of said calling incoming trunks, and means operative following the completion of a single pronouncement for releasing the cut-through relays of said incoming trunks.

8. In a telephone system, a station having an announcing machine thereat, a trunk extending from a central office to said station, a double wound start relay and a double wound polarized relay bridged in series across said trunk at said station, a marginal relay connected in series with said trunk at the central office, means at the central office for applying current to said trunk of such polarity and strength as to operate only said start relay, means controlled by said start relay to start said machine, means controlled by the starting of said machine to shunt one winding of said start relay and one winding of said polarized relay to thereby operate said marginal relay, means controlled by said marginal relay to reverse the direction of current flowing over said trunk to operate said polarized relay, and means controlled by said polarized relay to prepare said machine for transmitting a pronouncement over said trunk to said central office.

9. In a telephone system, a station having an announcing machine thereat, a trunk extending from a central office to said station, a double wound start relay and a double wound polarized relay bridged in series across said trunk at said station and a marginal relay connected in series with said trunk at the central office, means at the central office for applying current to said trunk of such polarity and strength as to operate only said start relay, means controlled by said start relay to start said machine, means controlled by the starting of said machine to shunt one winding of said start relay and one winding of said polarized relay to thereby operate said marginal relay, a timing device controlled by said marginal relay, means controlled after an interval by said timing device to reverse the direction of current flowing over said trunk to operate said polarized relay, and means controlled by said polarized relay to prepare said machine for transmitting a pronouncement over said trunk to said central office.

10. In a telephone system, an incoming trunk, a station having an operator's announcing equipment thereat, two equivalent trunks outgoing to said station, means for concurrently connecting both of said trunks to said equipment, means for connecting said incoming trunk to either one of said outgoing trunks, and means responsive to a trouble condition on the outgoing trunk to which said incoming trunk is connected for automatically transferring said incoming trunk into connection with the other outgoing trunk.

11. In a telephone system, an incoming trunk, a station having an operator's announcing equipment thereat, two equivalent trunks outgoing to said station and each including a repeater and a voice current detector, means for connecting said incoming trunk to either one of said outgoing trunks, means for concurrently connecting both of said trunks to said equipment, and means controlled by the voice current detector of the outgoing trunk to which said incoming trunk is connected if the associated repeater fails to pass voice current for automatically transferring said incoming trunk into connection with the other outgoing trunk.

12. In a telephone system, a plurality of incoming trunks, a station having an operator's announcing equipment thereat including a calling lamp, an announcement lamp and an answering key, a trunk outgoing to said station, means responsive to the seizure of any of said incoming trunks for transmitting a start signal over the outgoing trunk for lighting said calling lamp, means responsive to the operation of said key by said operator for transmitting a cut-through signal to such of said incoming trunks as are at the time in a calling condition for completing speech transmission circuits from said incoming trunks to said announcing equipment, and means operative a predetermined interval thereafter for transmitting a second signal over said outgoing trunk for lighting said announcement lamp.

JOHN BAUMFALK.
WILLIAM BENNETT.
PAUL L. WRIGHT.